US006631952B1

(12) United States Patent
Liebetrau et al.

(10) Patent No.: US 6,631,952 B1
(45) Date of Patent: Oct. 14, 2003

(54) AUTOMOBILE SEAT

(75) Inventors: Matthias Liebetrau, Coburg (DE); Harald Baetz, Bad Rodach (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 09/936,884
(22) PCT Filed: Mar. 15, 2000
(86) PCT No.: PCT/DE00/00843
§ 371 (c)(1),
(2), (4) Date: Sep. 17, 2001
(87) PCT Pub. No.: WO00/55002
PCT Pub. Date: Sep. 21, 2000

(30) Foreign Application Priority Data

Mar. 15, 1999 (DE) .......................................... 199 11 358

(51) Int. Cl.[7] ................................................ B60N 2/20
(52) U.S. Cl. ...................................................... 297/341
(58) Field of Search ........................... 297/341, 378.12, 297/378.1; 248/429, 430

(56) References Cited

U.S. PATENT DOCUMENTS

| 4,844,542 | A | * | 7/1989 | Humer ........................ 297/341 |
| 5,531,503 | A | * | 7/1996 | Hughes ....................... 297/341 |
| 5,597,206 | A | * | 1/1997 | Ainsworth et al. ........... 297/341 |
| 5,899,532 | A | * | 5/1999 | Paisley et al. ............... 297/341 |
| 5,918,939 | A | * | 7/1999 | Magadanz ................ 297/378.12 |
| 5,944,383 | A | * | 8/1999 | Mathey et al. .............. 297/341 |
| 6,017,090 | A | * | 1/2000 | Bonk ..................... 297/362.12 |
| 6,048,030 | A | * | 4/2000 | Kanda et al. ................ 297/341 |
| 6,102,478 | A | * | 8/2000 | Christopher ................. 297/341 |
| 6,152,533 | A | * | 11/2000 | Smuk .................... 297/378.12 |
| 6,231,123 | B1 | * | 5/2001 | Tame ....................... 297/378.1 |
| 6,254,188 | B1 | * | 7/2001 | Downey ...................... 297/341 |

OTHER PUBLICATIONS

English translation of International Preliminary Examination Report for International Application No. PCT/DE00/00843.

* cited by examiner

Primary Examiner—Peter M. Cuomo
Assistant Examiner—Stephen D'Adamo
(74) Attorney, Agent, or Firm—Christie, Parker & Hale, LLP

(57) ABSTRACT

An automobile seat includes a seat frame; a backrest swivel mounted on the seat frame which can be folded forwards towards the seat surface; a longitudinal guide with which the seat frame can be moved in the longitudinal direction of the seat in order to regulate the longitudinal position of the seat; a fixing device for locking the seat frame in a previously regulated seat longitudinal position; an operating element for unlocking the fixing device; a coupling mechanism which unlocks the fixing device when the back rest is folded forwards towards the seat surface; a memory device by means of which the seat frame can automatically be stopped in a predeterminable seat longitudinal position (memory position); a regulating device of the memory device with which the memory position can be regulated in the longitudinal direction of the seat; a locking device of the memory device for locking a regulated memory position; and a switching device with which the locking device can be unlocked in order to be able to adjust the memory position. The coupling mechanism only acts on the operating element to unlock the fixing device for as long as the backrest is folded forwards, and the seat frame can be locked by the fixing device when the backrest is not folded forwards.

50 Claims, 34 Drawing Sheets

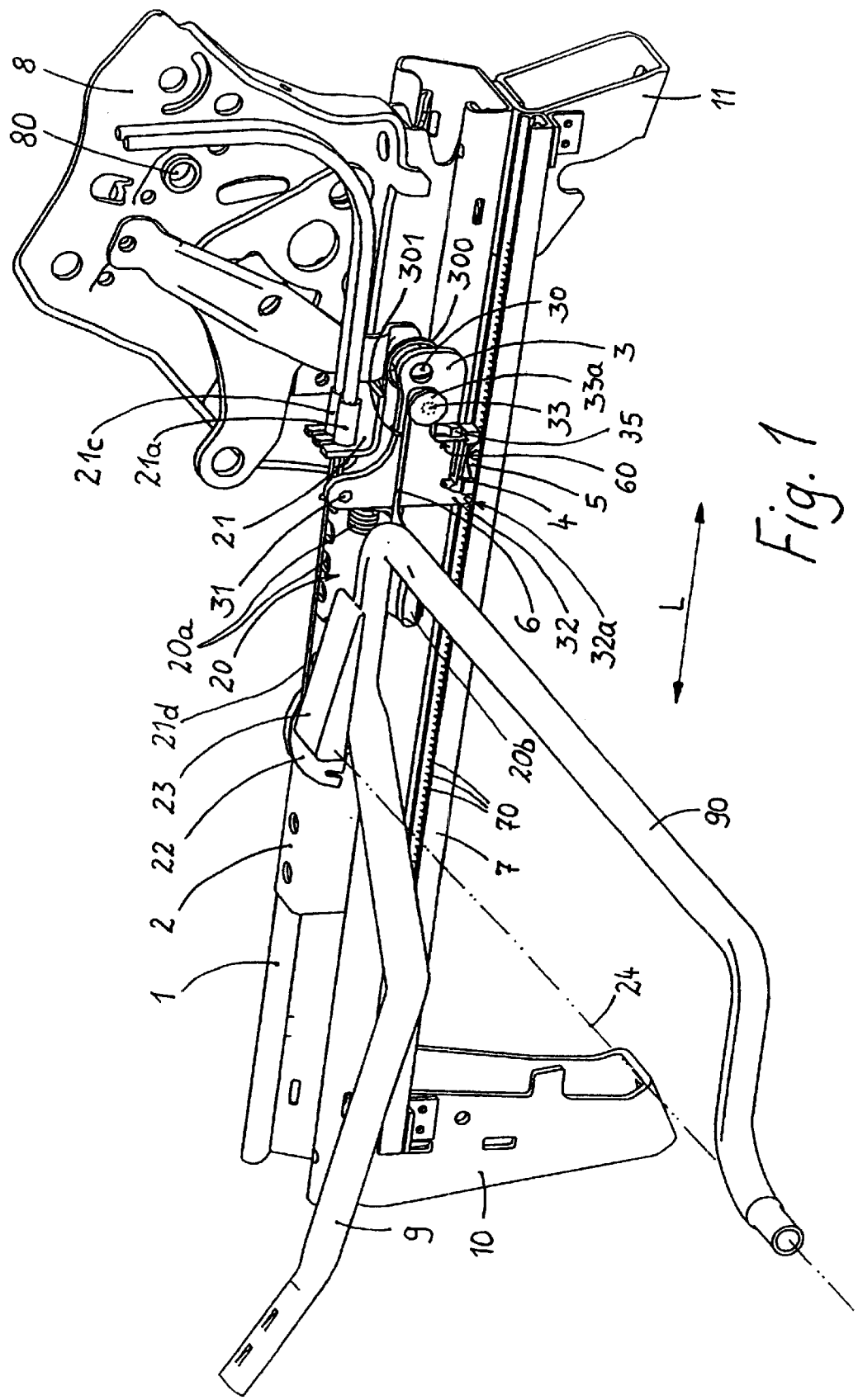

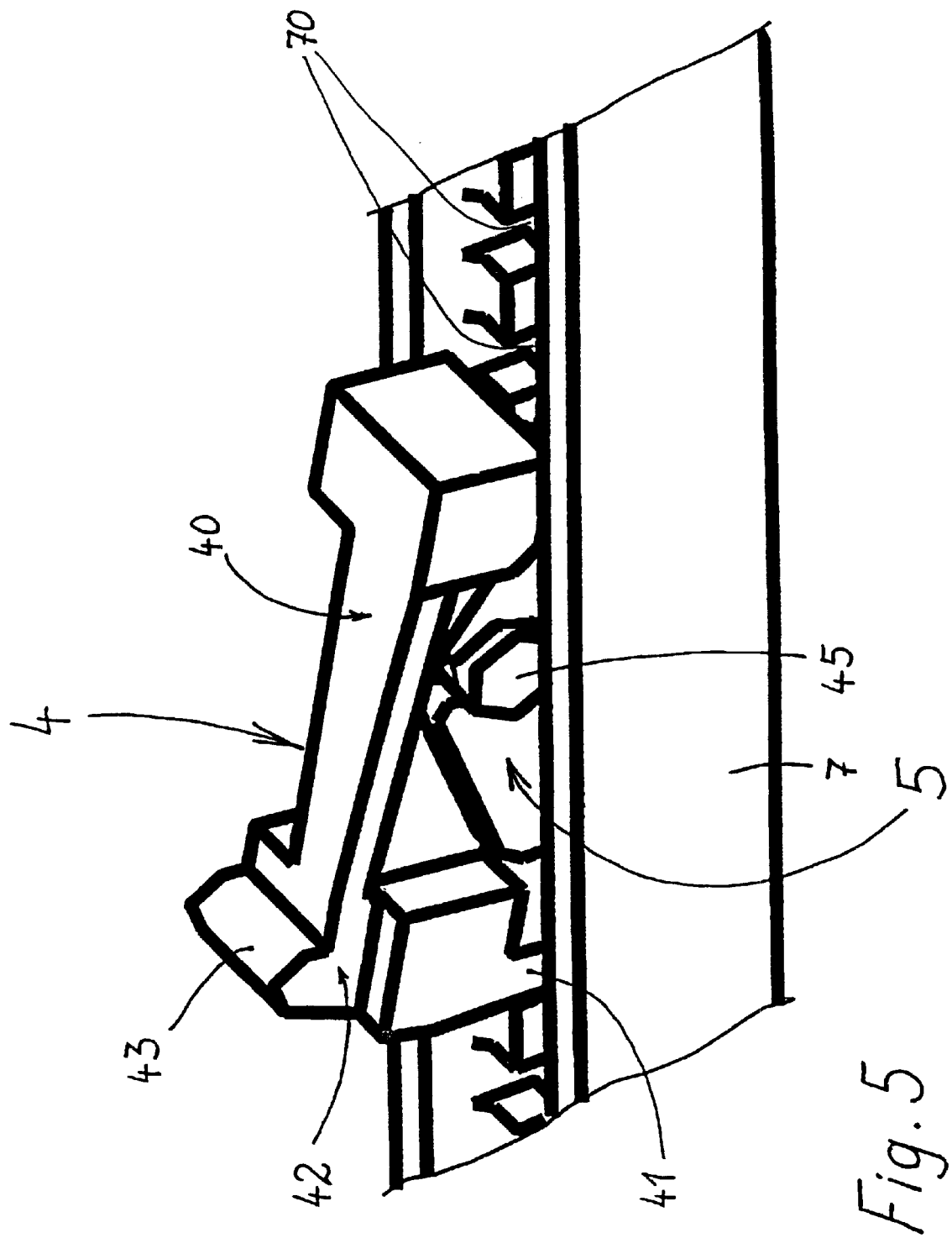

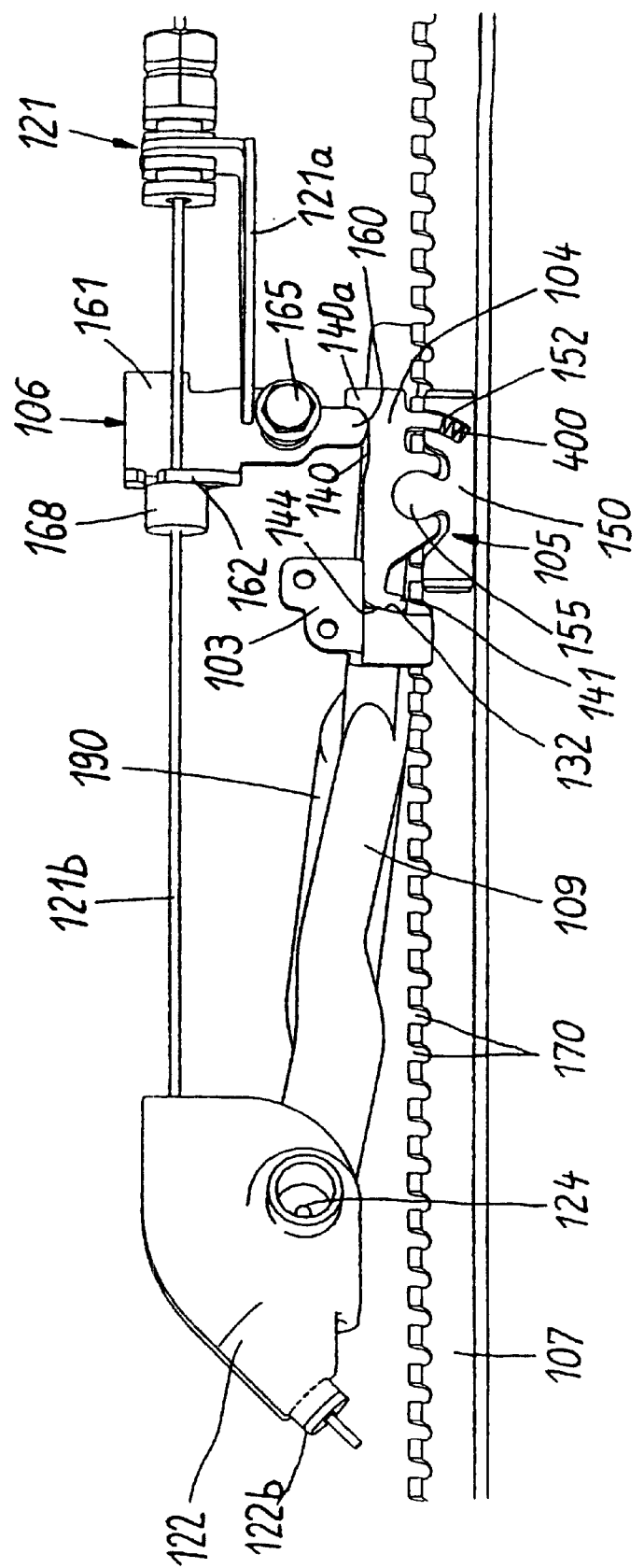

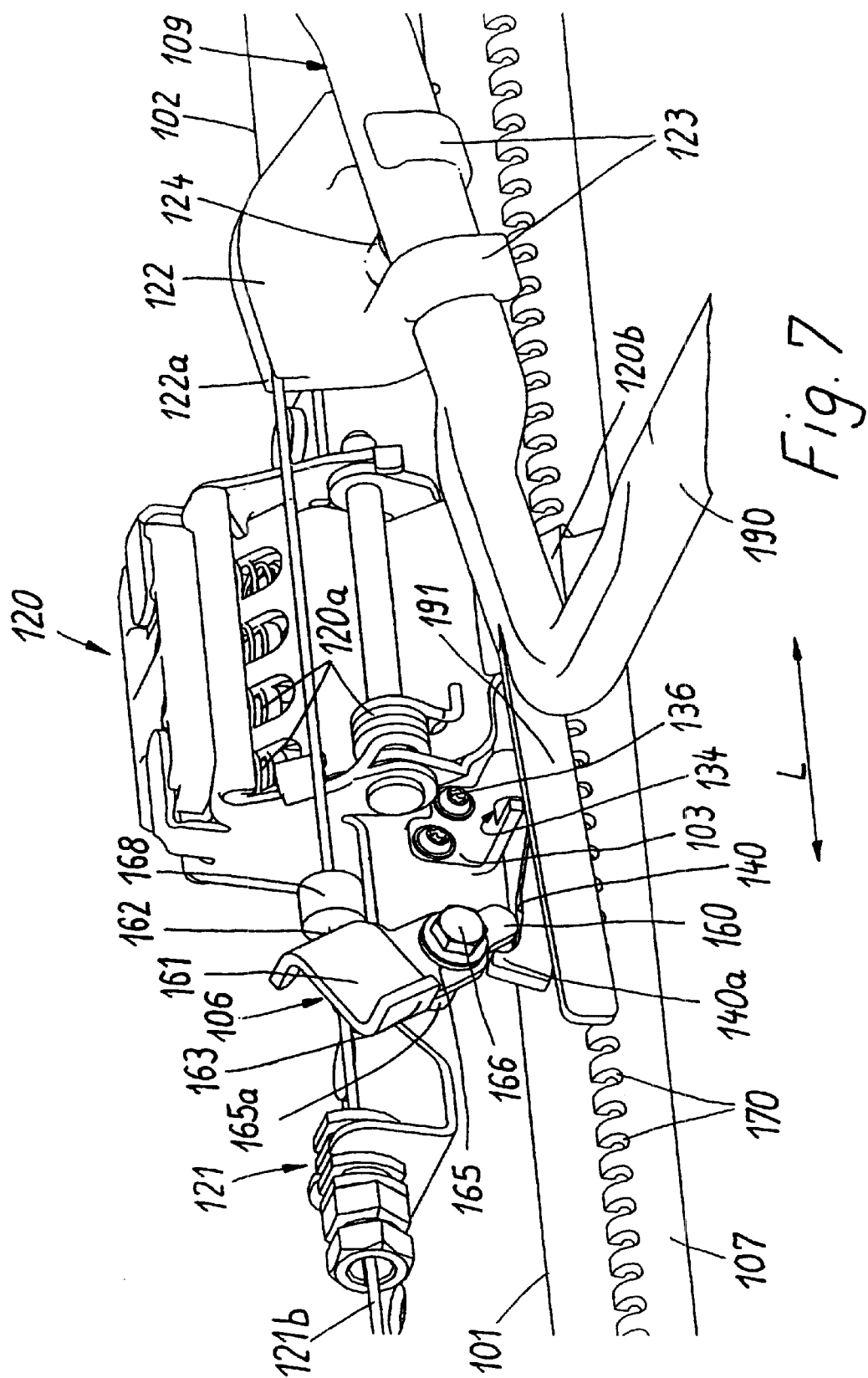

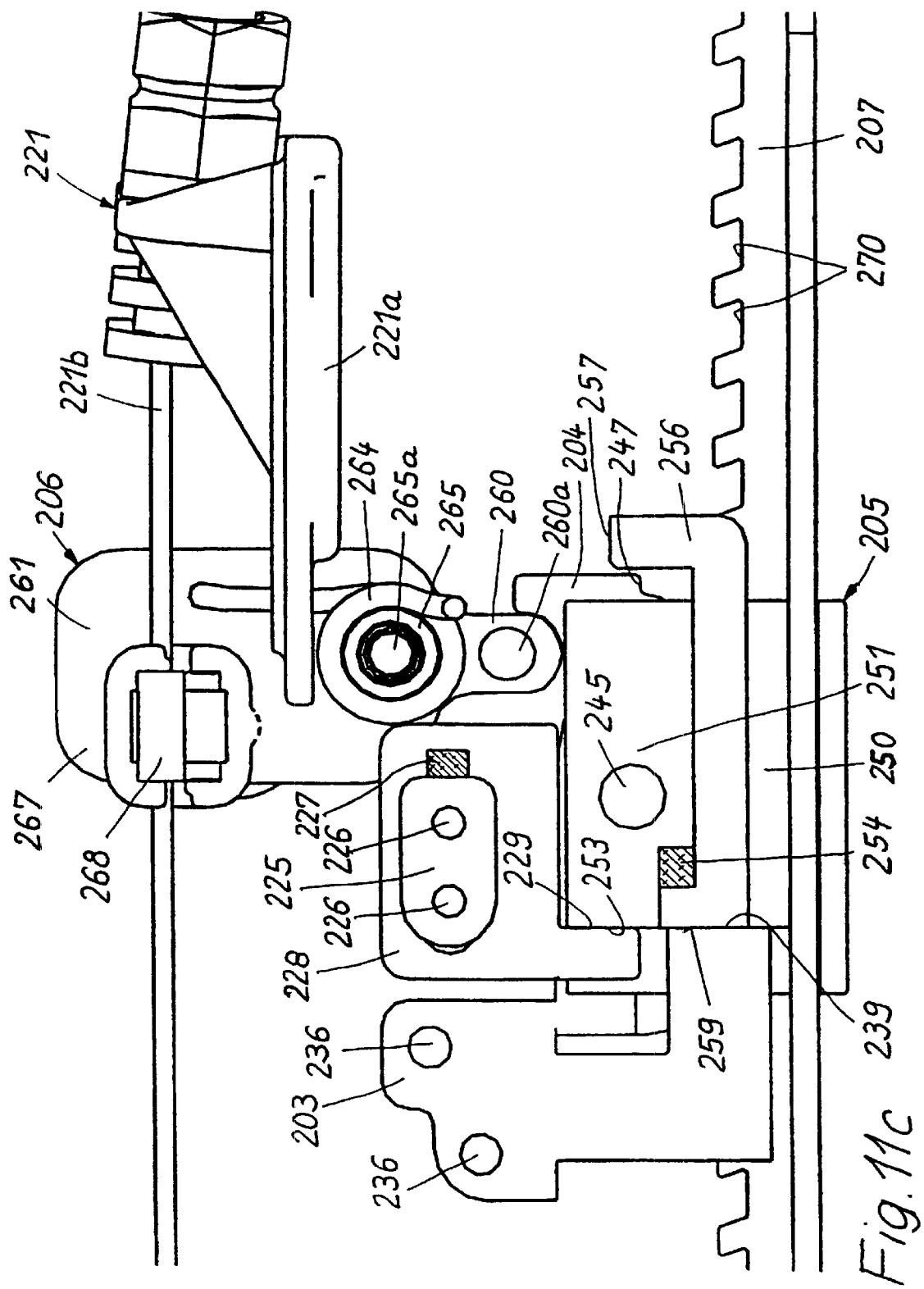

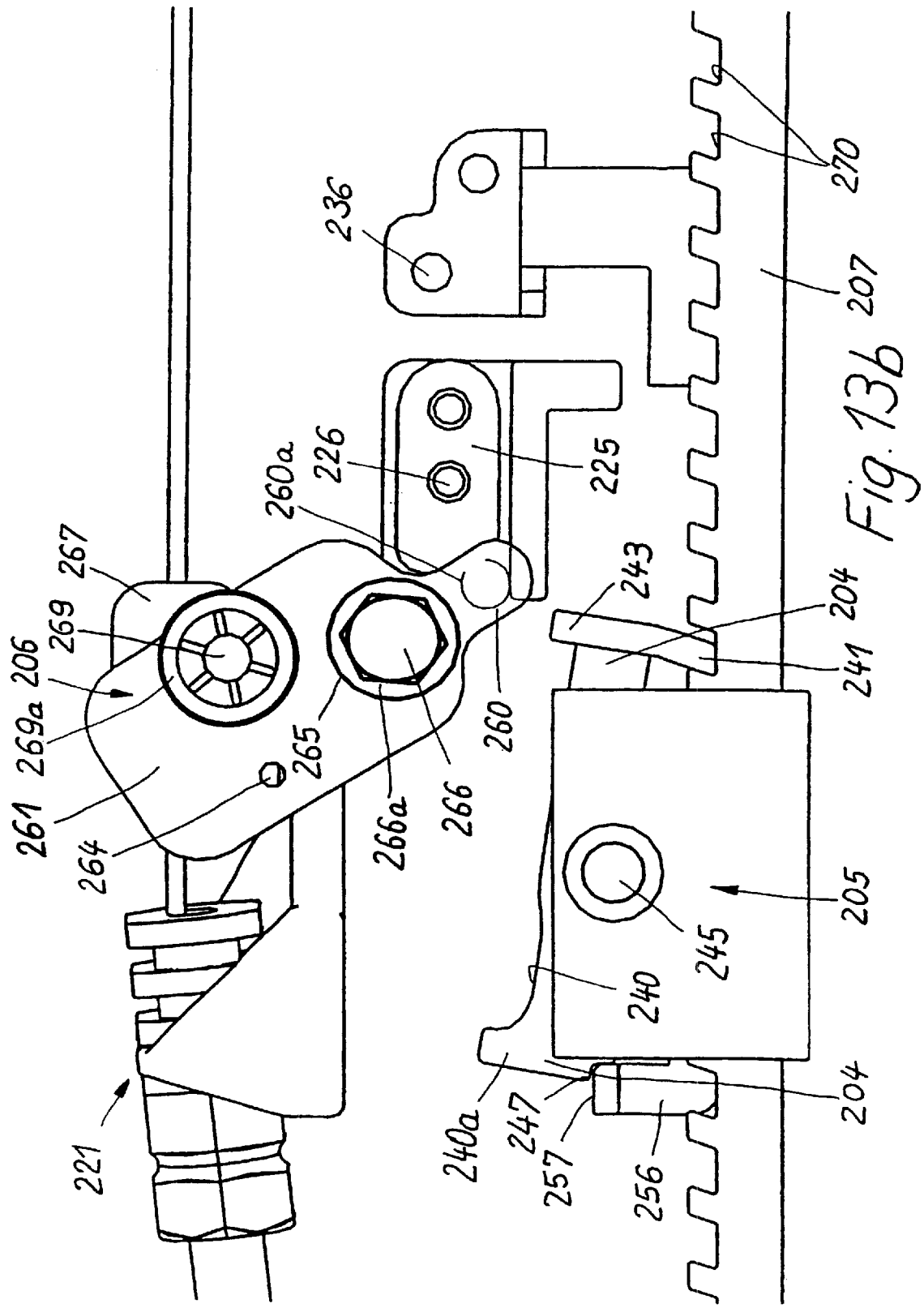

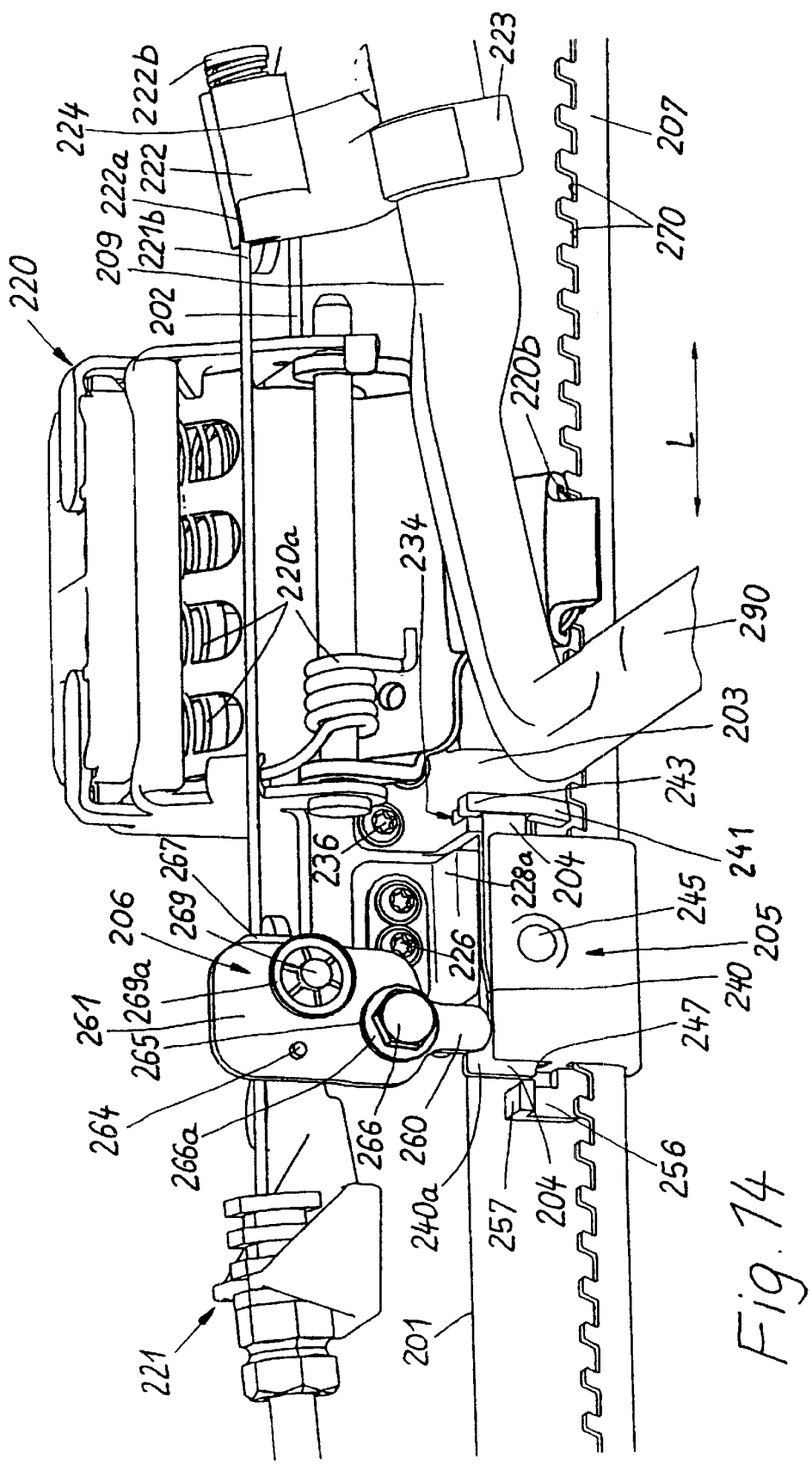

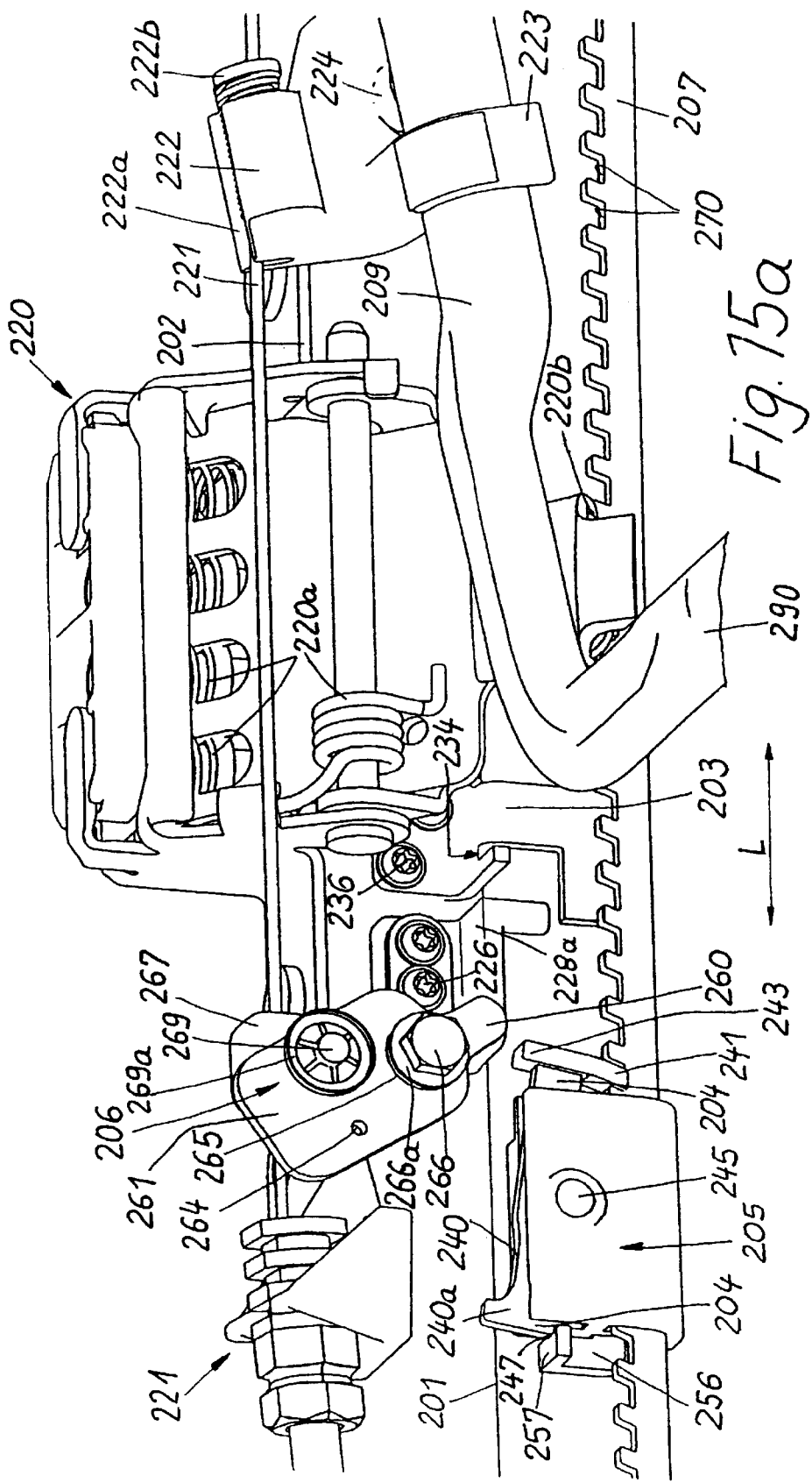

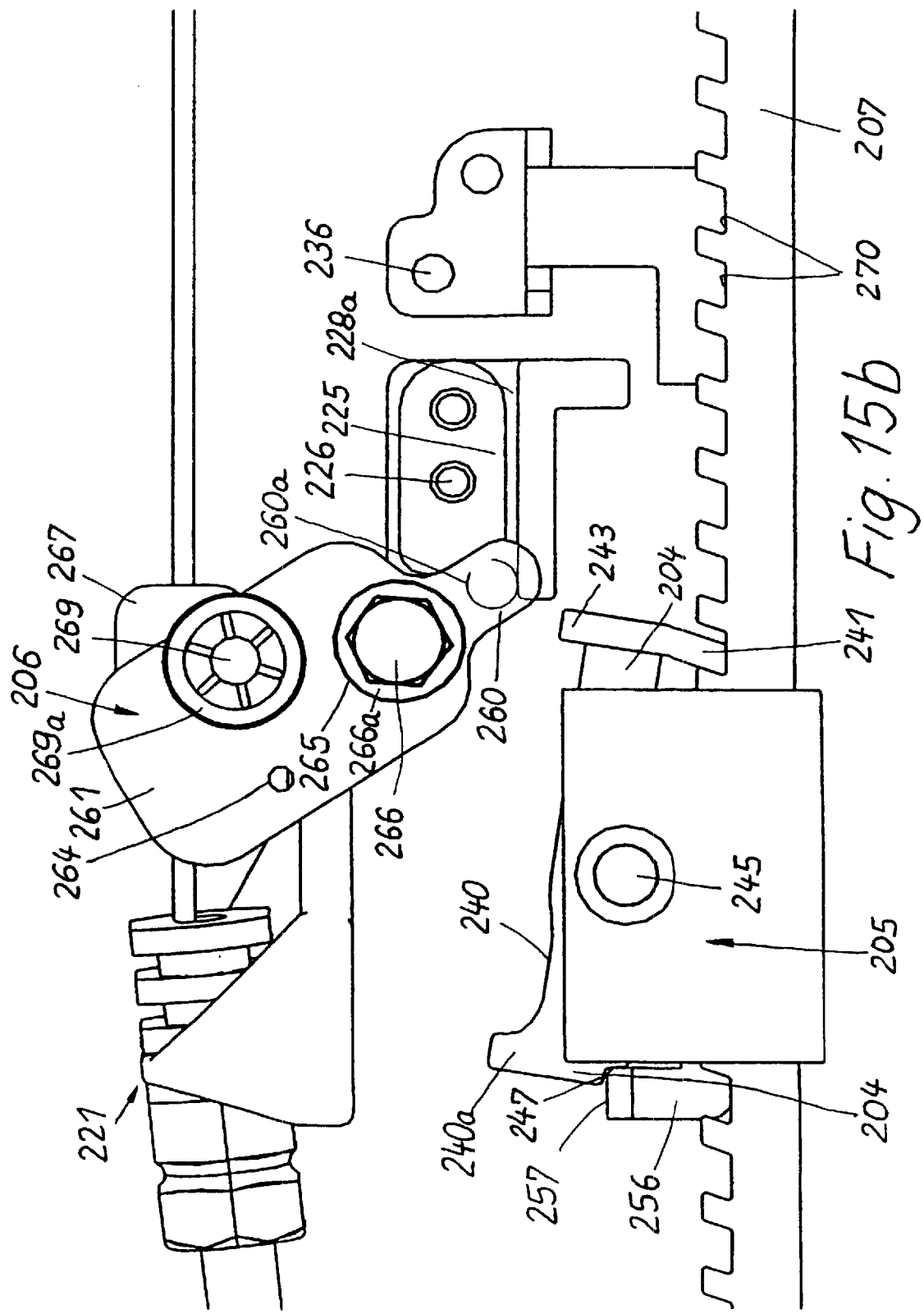

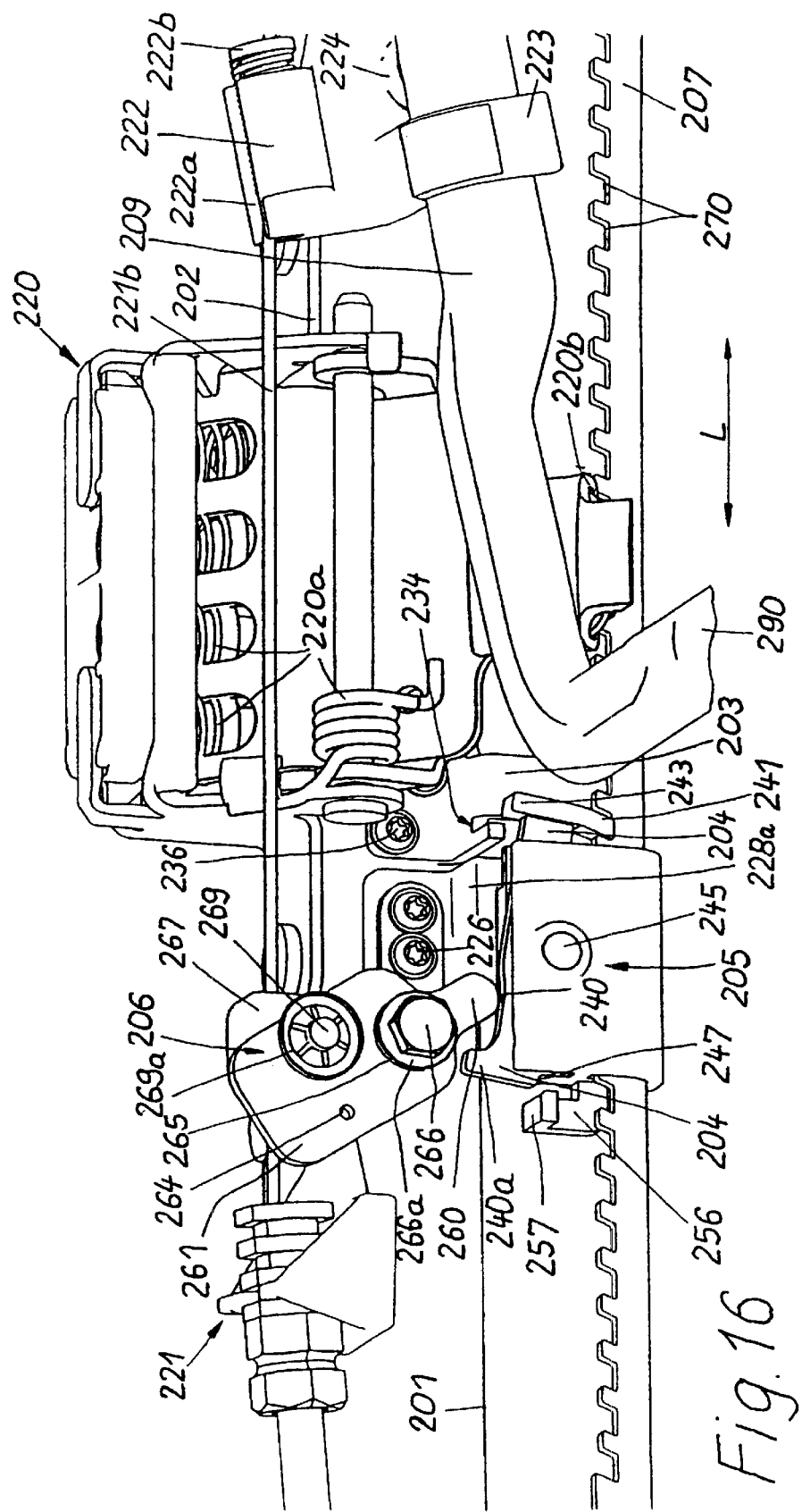

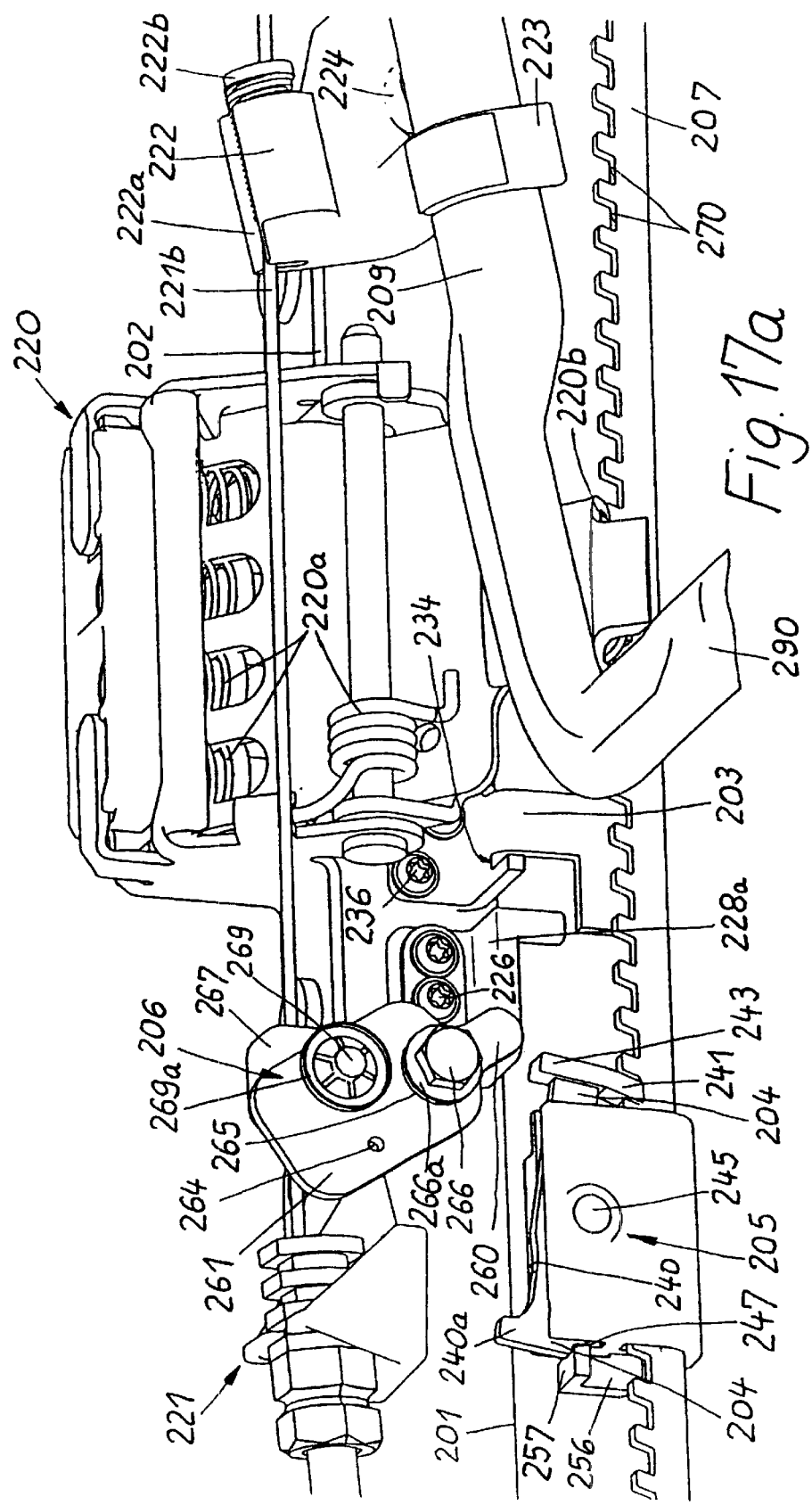

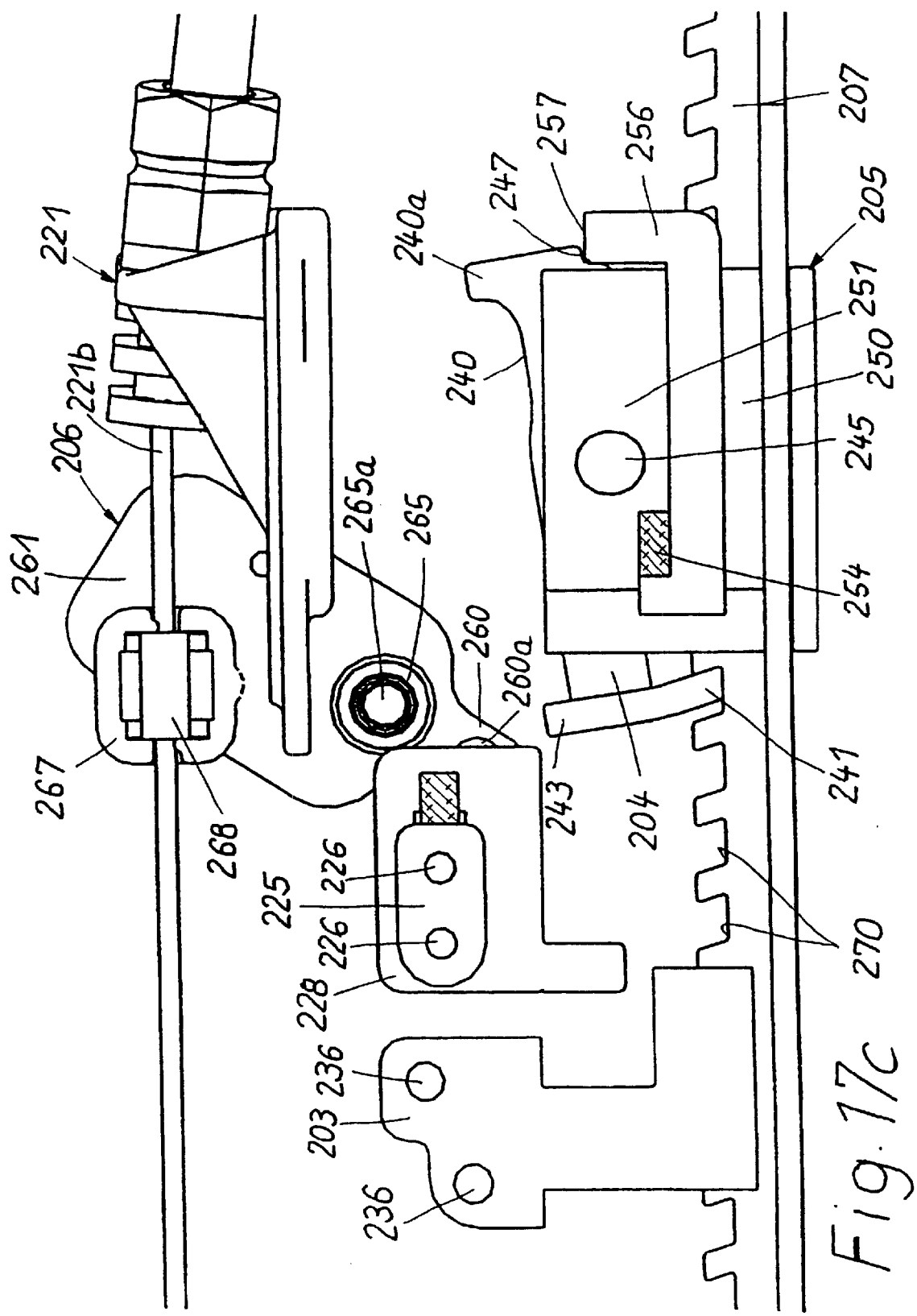

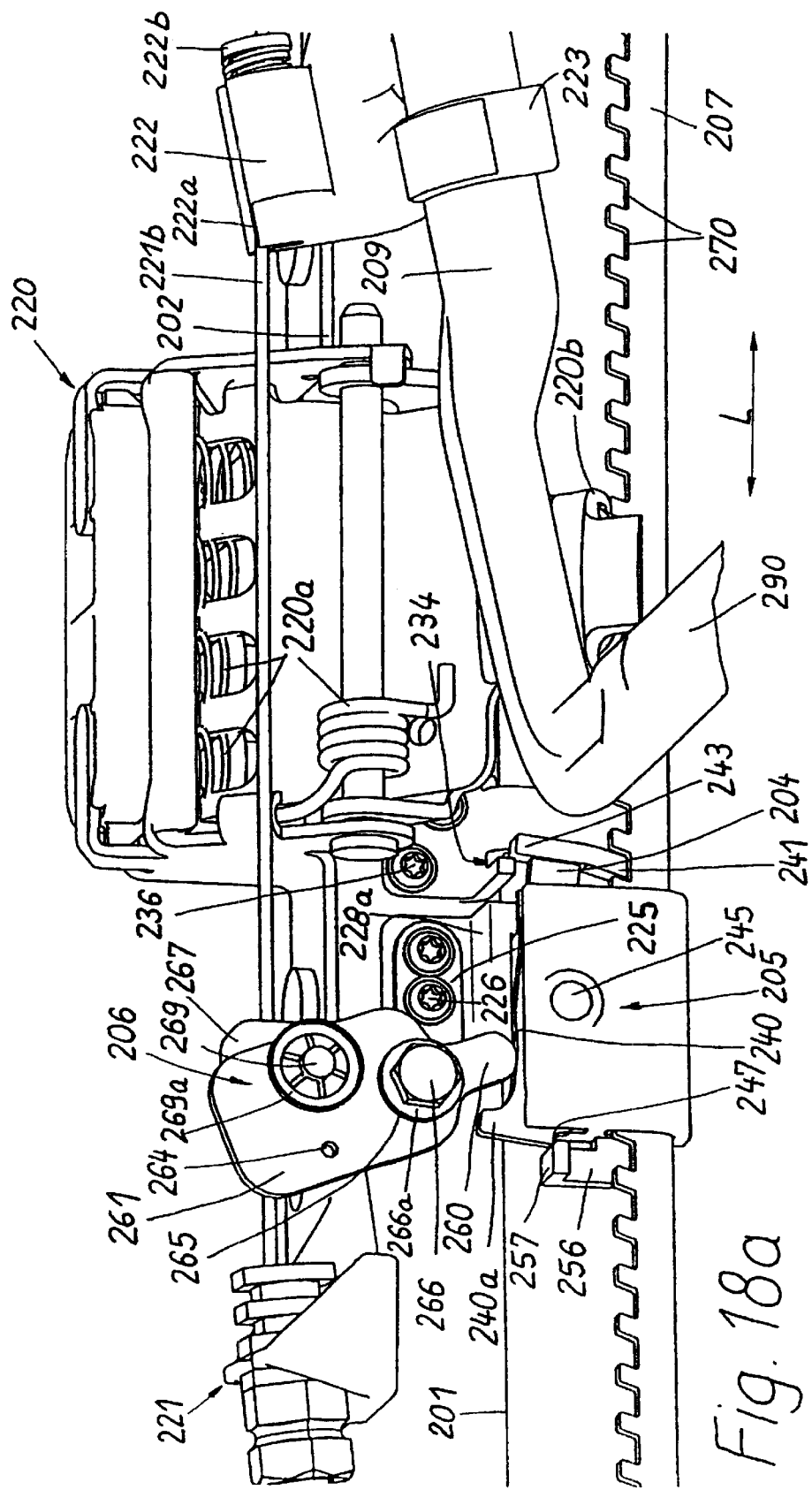

AUTOMOBILE SEAT

CROSS-REFERENCE TO RELATED APPLICATION

This application claims priority of International application number PCT/DE00/00843, filed Mar. 15, 2000, which in turn claims priority to German patent application number 199 11 358.0, filed Mar. 15, 1999.

FIELD OF THE INVENTION

The invention relates to an automobile seat with a seat frame, a seat surface provided on the seat frame, and a backrest which is pivotally mounted on the seat frame and can be folded towards the seat surface.

BACKGROUND OF THE INVENTION

Seats of this kind are used as front seats in automobiles so that by folding the backrest forwards it makes it easier for the passenger to climb into the back of the vehicle or to slide an object into the back of the vehicle. It becomes even easier to climb into the back of the vehicle, particularly in the case of two-door vehicles, if the seat can be pushed forwards after the backrest has been folded forward.

For this the automobile seat has the following features:
- a longitudinal guide with which the seat frame can be moved in the longitudinal direction of the seat in order to adjust the longitudinal position of the seat;
- a fixing device for locking the seat frame in a previously set seat longitudinal position;
- an operating element for unlocking the fixing device so that the seat frame can be moved in the longitudinal direction of the seat;
- a coupling mechanism for coupling the fixing device to the backrest which acts on the operating element and thereby unlocks the fixing device when the backrest is folded forwards towards the seat surface;
- a memory device by means of which the seat frame during movement in the longitudinal direction of the seat can be stopped automatically in a predeterminable longitudinal seat position defined as the memory position, where a stop associated with the seat frame and movable in the longitudinal direction of the seat comes into engagement with a counter stop of the memory device;
- regulating means for the memory device with which the memory position can be regulated in the longitudinal direction of the seat by adjusting the position of the counter stop;
- a locking device for the memory device for locking a selected memory position; and
- switching means with which the locking device can be unlocked in order to be able to regulate the memory position.

A seat of this kind offers on the one hand the possibility, after folding the backrest forwards towards the seat surface, of sliding the seat frame, and thus the entire vehicle seat, forwards in order to make it easier for a passenger to climb into the back (easy-entry function). Then at the same time the seat can be very easily moved back again into its original longitudinal position if this longitudinal position of the seat is stored as the memory position by means of the memory device which is provided for this purpose. In this case the seat frame is automatically stopped in the memory position as the seat is pushed back, with a stop associated with the seat frame interacting with a counter stop of the memory device.

In the case of a vehicle seat of this kind which is known from DE 42 01 829 A1 and which has a seat frame with a backrest which can be folded forwards, a longitudinal guide for regulating the longitudinal position of the seat, a fixing device associated with the longitudinal guide, and a coupling mechanism with which the fixing device can be unlocked when the backrest is folded forwards towards the seat surface, the fixing device can only be locked again after the seat has been moved with the backrest folded forwards, after the seat has been moved back into the original position which has been memorised by the memory device. This not only involves a reduction in operating comfort but can also result in a considerable risk of danger to a person seated on the seat if this person takes up their place on the seat before the seat has been moved completely back into its memory position, e.g. because luggage or packages behind the seat prevent the seat from moving back into the memory position. A person seated on a vehicle seat which has not been locked is exposed to a considerable risk of injury in the event of a crash.

From DE 196 47 447 A1, a vehicle seat is known having a fold-forward backrest, an easy-entry function with the backrest folded forward and memory function for relocating the original seat position which can also be locked outside of the memory position and can thus be brought into a safer useful position. With this seat, gearing is provided with which longitudinal movement of the vehicle seat can be converted into rotary movement of individual gear elements. The memory function is hereby provided by means of stops and spring elements which interact with the rotatable gear elements. This known vehicle seat has the drawback however that a comparatively high assembly expense is required in order to produce a sufficiently precise match between the different displaceable, swivelling and rotatable component parts which are provided to produce the combined easy-entry and memory functions.

SUMMARY OF THE INVENTION

The object of the invention is therefore to provide an automobile seat of the type mentioned at the beginning which has both a simple construction and a high functional reliability.

According to an embodiment of the invention, the coupling mechanism, which acts on the operating element of the fixing device and unlocks the fixing device when the backrest is folded forwards towards the seat surface, only acts on the operating element so long as the backrest is folded forwards. Thus, the seat frame can be locked at any time by locking the fixing device if the backrest is no longer folded forwards, thus, folded back again into its functioning position. In particular, when the backrest is folded up, the ability of the seat frame to be locked in an actual longitudinal position of the seat is independent of whether the relevant longitudinal position, at that time, of the seat corresponds to the memory position.

A solution according to an embodiment of the invention leads to an increase in operating comfort, since the variability is increased regarding the longitudinal positions of the seat which can be regulated and locked after implementing the easy-entry function. At the same time, the functional reliability is improved since the seat can also then be locked even if it is not located in the memory position so that no safety risk can arise as a result of an inadequately secured seat.

The seat frame includes all the constituent parts of the supporting seat structure which can be moved in the longitudinal direction of the seat, and also those constituent parts of the longitudinal guide of the seat, such as e.g. a seat rail (top rail) which is moved in the longitudinal direction when regulating the longitudinal position of the seat.

In an embodiment of the invention, locking means are provided which are coupled to the backrest and which, when the backrest is folded forwards, act on the switching means provided for unlocking the locking device of the memory device so that when the backrest is folded forwards, unlocking the locking device is prevented. Therefore, when the backrest is folded forwards, the locking device of the memory device is always locked so that no change can be made to the memory position.

The locking means can be coupled to the backrest, for example, through a push or pull means, more particularly in the form of a cable. However, a lever arrangement or other gearing can also be used for coupling. It is only necessary for the means which are used for coupling to be suitable for converting a swivel movement of the backrest into a movement of a locking element and to bring this into a position in which it blocks the unlocking of the locking device for the memory device.

The locking means can thereby be coupled to the backrest through the same coupling mechanism as the operating element which causes the unlocking of the fixing device of the seat longitudinal guide when the backrest is folded forwards.

In order to bring a locking element of the locking means into engagement with the switching means it can be proposed, for example, that when folding the backrest forwards, the locking element is moved in the longitudinal direction of the seat. As an alternative, a swivel movement of the locking element when folding the backrest forwards, or any other type of movement, can be provided.

The locking element has, for example, a stop which, when the backrest is folded forwards, comes into active connection with the switching means in order to block any unlocking of the locking device of the memory device. Alternatively, the locking element can also be connected to the switching means and when the backrest is folded forwards acts on the switching means so that unlocking of the locking device is hereby prevented.

The switching means which are provided for unlocking the locking device of the memory device can be formed, for example, by a switching lever or by a switching spring wherein the latter is swivelled for unlocking the locking device and the latter is formed for the same purpose. A displaceable switching means can likewise be used.

The switching means are preferably mounted on the seat frame and are arranged so that they can only then act on the locking device for the purpose of unlocking the locking device when the seat frame is located in the memory position. This means that a change in the memory position, which does indeed presuppose an unlocking of the locking device, can only then be undertaken when the seat frame is located in the actual memory position.

In an advantageous further development the switching means are elastically pretensioned in the direction of a first switching position and can be switched against the action of this pretension into a second switching position where in one of the two switching positions the locking device is locked and in the other switching position the locking device is unlocked.

In one embodiment of the invention, the switching means are coupled to the fixing device of the longitudinal guide of the seat when the seat frame is located in the memory position and can therefore be switched at the same time during operation of the fixing device.

According to one variation during unlocking of the fixing device, the switching means are switched so that the locking device is unlocked. This means that during unlocking of the fixing device of the seat longitudinal guide in the memory position, the locking device of the memory device is also unlocked at the same time so that a new memory position can be set. However, through the aforementioned locking means it can also be ensured that this is only then possible when the backrest is not located in the forward folded position. For when moving the seat for the purpose of easier entry into the vehicle there should indeed, as a rule, be no change to the memory position.

According to another variation when locking the fixing device for the longitudinal seat guide, the switching means are switched so that the locking device for the memory device is unlocked. With this vaiation the regulating means for the memory device provided for changing the memory position are thus automatically switched free during locking of the fixing device for the seat longitudinal guide. Then the fixing device is again unlocked in order to be able to move the seat frame in the longitudinal direction of the seat it is also possible for a correction to the memory position to take place at the same time. Obviously, by means of the aforementioned locking means, it can also be brought about that the free switching of the regulating means for the memory device is only possible when the backrest is not folded forward.

It can furthermore be proposed that, in the memory position of the seat frame, when the backrest is not folded forward and when the locking device for the memory device is unlocked, the switching means are supported so that when the fixing device is unlocked the switching means are not shifted. For this, the switching means can be supported, for example, on a support surface or can also be pretensioned into a certain position by means of an elastic element.

In order to prevent the regulating means of the memory device automatically being switched free when approaching the memory position, with the result that during subsequent adjustment of the longitudinal position of the seat the memory position would also be changed at the same time, it can be proposed that the switching means on approaching the memory position with the backrest not folded forward are at first deactivated and an immediate unlocking of the locking device for the memory device is thereby blocked. During subsequent locking of the fixing device, the switching means can then be activated so that they can again act on the locking device for the memory device for the purpose of unlocking same. This can be carried out in particular if the locking device is automatically unlocked during subsequent unlocking of the fixing device.

In order to deactivate the switching means on approaching the memory position with the backrest not folded forward, it can be proposed that the switching means are associated with a guide face of the memory device and that this guide face is designed so that the switching means on approaching the memory position are guided along the guide face and can thereby not act on the locking device. With subsequent locking of the fixing device the switching means can then be automatically activated so that they are again lifted away from the guide face. With subsequent renewed unlocking of the fixing device (with the backrest not folded forwards) the switching means can again act on the locking device of the memory device in order to freely switch the regulating means.

In another embodiment, the switching means are associated with a stop face of the memory device which is arranged so that on approaching the memory position with the backrest not folded forwards it acts on the switching means in order to prevent unlocking of the locking device through the switching means. With subsequent locking of the fixing device, the switching means are thereby activated so that they are again lifted from the stop face.

In another embodiment of the invention, the locking device of the memory device is elastically pretensioned towards its locked position and the switching means can act in the memory position when the backrest is not folded forwards on the locking device so that this is unlocked against the elastic pretension.

The locking device for the memory device preferably consists of a locking unit which can be displaced together with the counter stop of the memory device in the longitudinal direction of the seat, and a detent device which is associated with the locking unit and which has detent positions set in succession in the longitudinal direction of the seat at which the locking unit can be locked relative to the detent device in order to fix the memory position.

The locking unit can comprise, for example, a swivel mounted locking pawl which has a detent element, which can engage in the detent positions of the detent device, whereby the locking pawl is provided with an operating section on which the switching means can act in order that the detent element can engage in the detent device or disengage therefrom.

When setting the longitudinal position of the seat, in order that the memory position can be adapted at the same time, the memory device has a follower which can be brought into engagement with the seat frame so that the counter stop and the locking unit of the memory device can be moved together with the seat frame in the longitudinal direction of the seat. The follower is, for this purpose, associated with an engagement area of the seat frame, and the follower can be brought into engagement with the engagement area, for example, by swivelling the follower and engagement area relative to each other.

The follower and the engagement area can preferably only be brought into engagement with each other when the seat frame is located in the memory position and when the locking device for the memory device is unlocked. The follower itself can be mounted, for example, on the locking pawl.

The regulating means with which the memory position can be regulated can advantageously be formed by a glide which is mounted movable in the longitudinal direction of the seat and on which the locking unit and counter stop of the memory device are mounted.

According to a further variation of the invention, it is proposed that at least one elastically pretensioned slider is mounted movable on the memory device or on the seat frame, and in the memory position is supported against pretension on a stop element of the seat frame or memory device, and during displacement of the seat frame is moved out from the memory position (with the backrest folded forward) as a result of the said pretension into such a position that it prevents unlocking of the locking unit. It is hereby ensured that, outside of the memory position, it is not possible for the locking unit of the memory device to become unlocked.

According to a variation the locking unit itself hereby has an elastically pretensioned movably mounted slider which, in the memory position, is supported against pretension on a stop element of the seat frame and which during displacement of the seat frame is moved out of the memory position as a result of the pretension into such a position that it prevents unlocking of the locking unit outside of the memory position. Thus, the slider can be moved, for example, during displacement of the seat frame out from the memory position as a result of the pretension into such a position that it engages on the locking pawl of the locking unit and thereby prevents the locking pawl from becoming unlocked.

According to another or complimentary variation the seat frame has an elastically pretensioned movably mounted slider which is supported in the memory position of the seat frame against the pretension on a stop element of the memory device and which, during displacement of the seat frame, is moved out from the memory position with the backrest folded forward as a result of the pretension into such a position that it blocks the switching means from acting on the locking device which would lead to unlocking of the locking device. It is thereby further ensured that the position of the slider is not influenced when later folding the backrest back up outside of the memory position from the forward folded position. It is hereby reached that folding the backrest back up outside of the memory position does not lead to the regulating means for the memory device being released which would result in a change to the memory position.

If the seat frame is then moved back again into the memory position, then the slider interacts with a stop element so that the slider, on reaching the memory position, is moved against the pretension and thereby no longer blocks the unlocking of the locking device for the memory device.

If in this case the switching means are elastically pretensioned towards a switching position in which they engender unlocking of the locking device, then on reaching the memory position, unlocking of the locking device automatically takes place so that a new adjustment of the memory position is possible.

In another embodiment, it is hereby possible to design the spring by means of which the slider is pretensioned, so that the slider can only be moved against the pretension by applying comparatively larger forces. The slider is, in this case, only then moved into a position in which it no longer blocks unlocking of the locking device when the seat is moved by the user with a sufficiently large force into the memory position. Re-programming of the memory position can then take place.

If, however, the seat is only moved into the memory position with a comparatively lower force then the pretension acting on the slider cannot be overcome so that the slider blocks unlocking of the locking device.

BRIEF DESCRIPTION OF THE DRAWINGS

These and other features of the present invention will now be explained in further detail with reference to the specification, claims and drawings wherein:

FIG. 1 shows a perspective view of a seat frame with a seat longitudinal guide, a fixing device for the seat longitudinal guide, a seat side part on which a backrest is mounted for swivel movement, as well as with a programmable memory device for automatically finding a predeterminable longitudinal position of the seat.

FIG. 5 shows an enlarged view of the locking device for the memory device where the memory device can be locked in a previously approached memory position.

FIG. 6a shows a rear view of the embodiment of FIG. 6.

FIG. 7 shows a view according to FIG. 6 where the backrest is folded forward in order that the seat can be displaced with the backrest folded forward.

FIG. 1b shows a detailed view of the illustration of FIG. 11a.

FIG. 13b shows a detailed view of the illustration of FIG. 13a without the rails of the longitudinal guide of the seat.

FIG. 14 shows a view according to FIG. 11a where the fixing device of the longitudinal guide of the seat has been unlocked in the memory position of the seat by means of an operating lever in order that the memory position can be reset.

FIG. 15a shows a view according to FIG. 11a where the memory position of the seat approached with the backrest folded forward.

FIG. 15b shows a detailed view of the illustration of FIG. 15a without the rails of the longitudinal guide of the seat.

FIG. 16 shows a view according to FIG. 11a where the seat reaches the memory position with the backrest folded forward FIG. 17a shows a view according to FIG. 11a where the backrest of the seat has been folded up in a longitudinal position of the seat outside of the memory position.

FIG. 17c shows a rear view of the illustration of FIG. 17a without the rails of the longitudinal guide of the seat.

FIG. 18a shows a view according to FIG. 11a where the seat has reached the memory position with the backrest raised up.

FIG. 18b shows a detailed view of the illustration of FIG. 18a.

DETAILED DESCRIPTION

Figure 20:
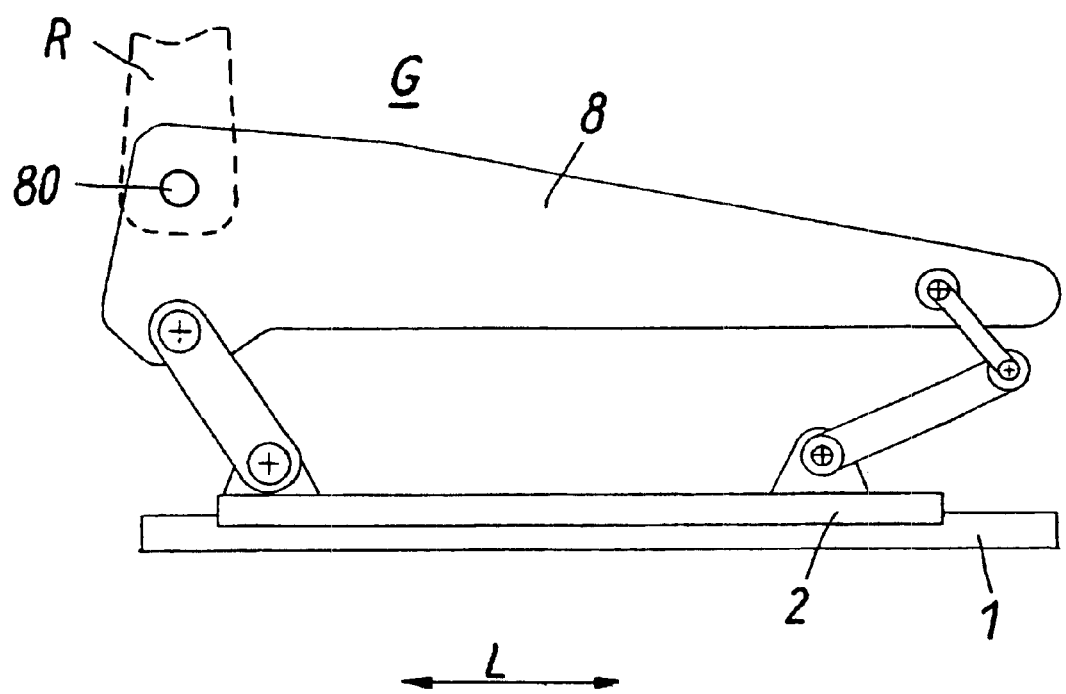
FIG. 20 shows a diagrammatic view of a seat frame.

The seat frame G (lower seat frame) shown in side view in FIG. 20 comprises a seat rail 2 which is mounted movable in the longitudinal direction L of the seat on a lower rail 1 which is to be fixed on the vehicle body, and a seat side part 8 which is attached vertically adjustable on the seat rail 2 through front and rear articulated levers. On its other longitudinal side, which cannot be seen in FIG. 20, the seat frame G has a corresponding arrangement. Between the two seat side parts of the seat frame G extends a seat surface which holds a seat cushion on which a vehicle occupant can sit.

Furthermore the side parts 8 of the seat frame G each have a bearing point 80 for swivel mounting a backrest R which is indicated by dotted lines in FIG. 20.

In this application, parts of the seat frame are meant to include all those component parts which are movable in the longitudinal direction of the seat on the lower rail 1 fixed on the body, thus in particular the seat rail 2, the seat side part 8 as well as further component parts of the seat connected thereto.

If a vehicle seat of this kind, which can be adjusted in the longitudinal direction L, is used for a two-door vehicle, then it is known, in order to facilitate entry into the back of the vehicle, to couple the backrest to the seat longitudinal adjustment device so that when the backrest R is folded forwards towards the seat surface, which extends between the seat side parts 8, a fixing device associated with the seat longitudinal guide 1, 2 is unlocked and the seat can be pushed forwards with the backrest folded forwards. This is called an easy-entry function.

A design of an easy entry function according to the invention will be explained with reference to three embodiments wherein a memory device is provided which enables a rapid restoration of the previous seat position after the seat has been moved with the backrest folded forwards.

Figure 1A:
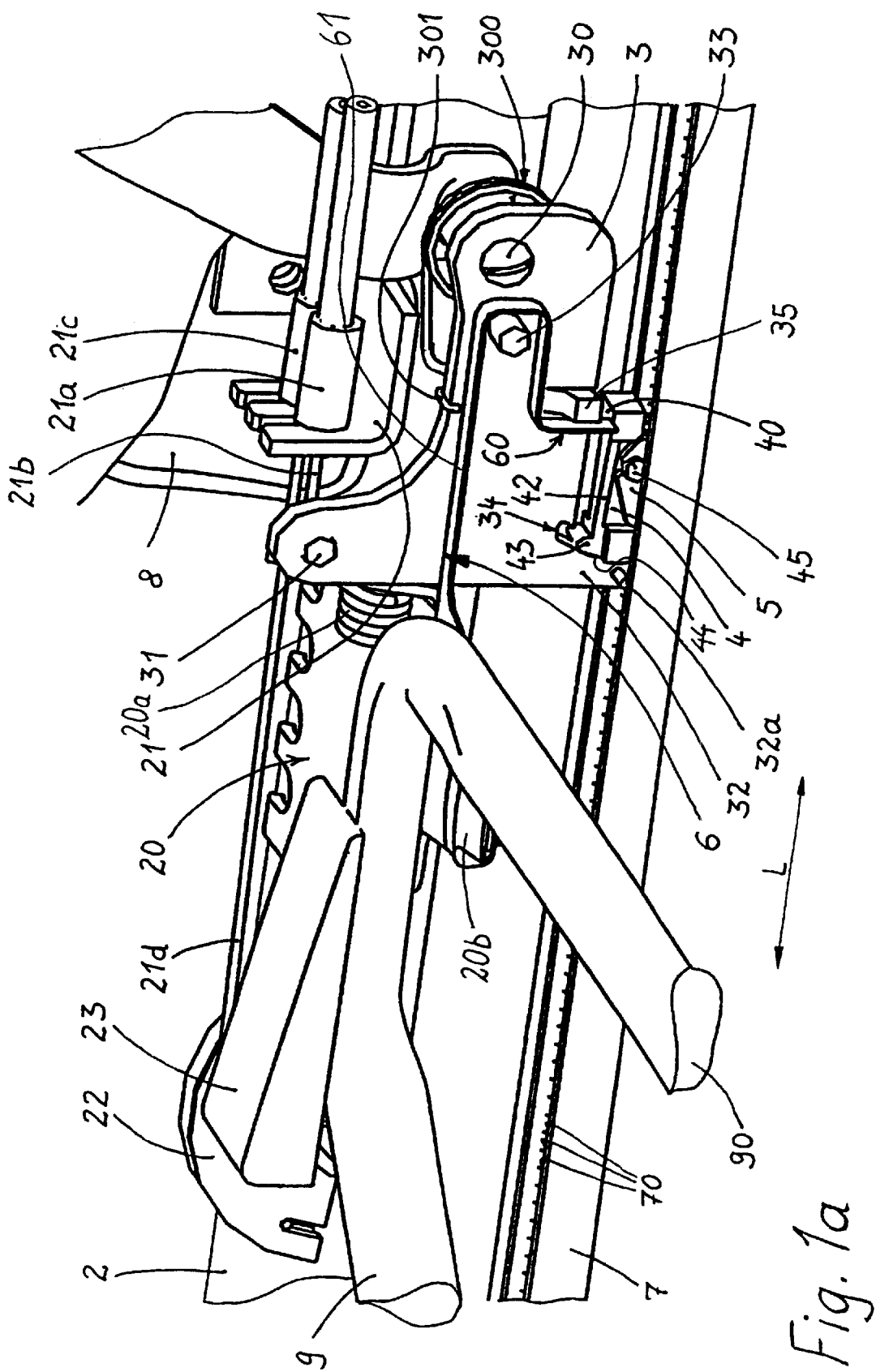
FIG. 1a shows an enlarged view of a section of FIG. 1 where the seat is locked in its memory position with the backrest folded up.
Figure 2:
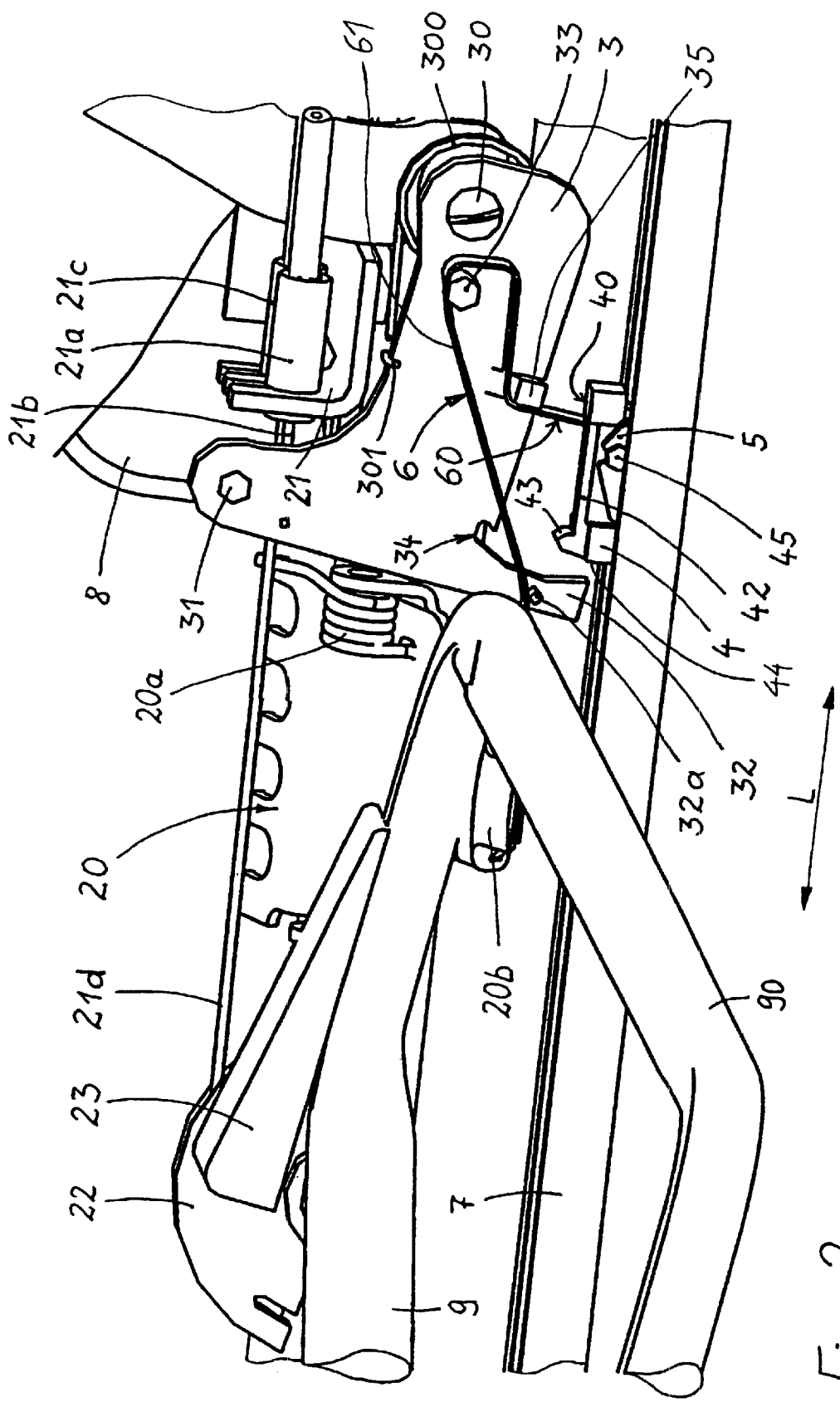
FIG. 2 hows a view according to FIG. 1a where the backrest has been folded forward order to slide the seat with the backrest folded forward.

In FIGS. 1 and 1a a part of a seat frame is shown which is guided over a seat rail 2 longitudinally movable on a lower rail 1 which in turn is fixable on the floor of a vehicle body through a front floor fastening 10 and a rear floor fastening 11. A seat side part 8 is connected to the seat rail 2, namely either directly or in the case of a height adjustable seat through a suitable articulated lever assembly which has a bearing point 80 on which a seat or backrest can be mounted for swivel movement, see FIG. 20.

By moving the seat rail 2 relative to the rail 1 on the body side in the longitudinal direction L of the seat it is possible to adjust or regulate the position of the seat frame (of which only the side part 8 can be seen next to the seat rail 2 in FIGS. 1 and 1*a*) regulating the longitudinal position of the seat.

In order to fix a longitudinal position of the seat which has been reached by sliding the seat rail 2 relative to the rail 1 on the body side, a fixing device 20 is used which can be a conventional fixing device for a longitudinal seat adjustment. FIGS. 1 and 1*a* show the housing, a swivel mounted operating element 20*b* as well as a torsion spring of a known fixing device 20 acting on the operating element 20*b* and whose housing is fixed on the seat rail 2. The torsion spring serves inter alia to remove the play from the arrangement in order to eliminate chattering noises.

This fixing device 20 comprises, for example, according to DE 299 10 720 U, a number of locking teeth mounted inside the housing (see also FIG. 6) which are pretensioned, by means of springs in the form of coil springs mounted in the housing, elastically towards to detent device which is fixed on the rail 1 on the body side but which cannot be seen in FIGS. 1 and 1*a*. As a result of the pretension acting on the locking teeth, the locking teeth associated with the seat rail 2 automatically engage into the detent device fixed on the body so that the longitudinal adjustment of the seat is locked if the locking teeth are not brought out of engagement with the detent device by means of the operating element 20*b*, which is provided for this purpose.

Since the operating element 20*b* of the fixing device 20 is pretensioned by the spring assembly 20*a*, which consists of the springs mounted inside the housing and acting on the locking teeth as well as of the torsion spring mounted outside of the housing, against the direction in which it has to swivel in order to unlock the fixing device 20, the fixing device 20 can only then be unlocked if a force is exerted on the operating element 20*b* against the action of the spring assembly 20*a*. For this, a swivel mounted operating lever 9 having a transverse tube 90 is provided in a known way which can be swivelled in a clockwise direction by the seat user using a handle and thereby acts on the operating element 20*b* of the fixing device 20 so that the fixing device becomes unlocked.

In the unlocked state of the fixing device 20, the seat rail 2 can be displaced relative to the rail 1 on the body side. As soon as the seat is adjusted into a longitudinal position which is acceptable to the seat user, the seat user can let go the handle of the operating lever 9 and as a result of the pretension force of the spring assembly 20*a*, the operating element 20*b* of the fixing device 20 as well as the operating lever 9, together, swivel back into a position in which the fixing device 20 is locked. The longitudinal position of the seat which has just been set is hereby securely locked.

According to FIGS. 1 and 1*a* the operating element 20*b* can be operated for unlocking the fixing device 20 by folding forward the backrest which is swivel mounted on the side part 8 of the seat towards the seat surface of the seat, see FIG. 20. The backrest of the seat, which is not shown in FIG. 1, is coupled to a swivel lever 23 by a Bowden cable unit whose Bowden tube 21*c* is supported on a Bowden suspension 21 and in which a cable 21*d* is guided. The swivel lever 23 is coupled to the operating lever 9. One end of the cable 21*d*, which is guided in the Bowden tube 21*c*, is mounted in a gearing 22 of the swivel lever 23, which converts the tensile force acting on the cable 21*d* into a swivel movement of the swivel lever 23 about an axis 24.

The Bowden tube and cable 21*c*, 21*d* and the gearing 22 are thereby designed so that when the backrest is folded forwards the cable 21*d* becomes taut which causes the swivel lever 23 to swivel about a swivel axis 24 so that the operating lever 9, and thus the operating element 20*b* of the fixing device 20, are swivelled downwards so that the fixing device 20 becomes unlocked. This means that after folding the backrest forwards the seat rail 2 can be displaced relative to the rail 1 on the bodywork side in order to change the longitudinal position of the seat. It thus becomes possible in particular to make it easier for passengers to get into the back of a two-door vehicle since, as the backrest of a front seat is folded forwards, the front seat can also be moved forwards at the same time so that there is correspondingly more room for the passenger to climb in behind the backrest.

In the situation illustrated in FIGS. 1 and 1*a*, however, neither the cable 21*d* is tensioned (thus the backrest is not folded forwards) nor has the operating lever 9 been manually operated by means of a handle so that the fixing device 20 is locked and the seat rail 2 is fixed relative to the rail 1 on the bodywork side.

The seat frame which is illustrated in FIGS. 1 and 1*a* furthermore has a memory device 4, 5, 7 with which the seat frame can be automatically stopped in a predeterminable longitudinal seat position (memory position) when it is moved by displacing the seat rail 2 relative to the rail on the bodywork side backwards in the longitudinal direction L of the seat (towards the rear seat end on the side of the backrest). The memory device at present serves, in particular, once the seat has been pushed forwards with the backrest folded forwards for the purpose of easier entry, to find again as fast as possible that longitudinal position of the seat in which the seat was located before its backrest was folded forwards and it was pushed forwards.

The memory device comprises as the essential constituent parts a locking unit in the form of a detent rocker or locking pawl 4, a glide 5, on which the locking pawl 4 is swivel mounted, as well as a detent rail 7 which interacts with the locking pawl 4.

The detent rail 7 is fixed on the rail 1 on the bodywork side, extends in the same way in the longitudinal direction L of the seat and has several detent openings 70 arranged in succession in this direction. Next to the detent openings 70 the glide 5 is guided, movable in the longitudinal direction L of the seat. According to the embodiment of FIG. 5*a*, the guide 5 has a base or guide member 50 through which the glide 5 is mounted longitudinally movable in a slide track, as well as a bearing area 51 which is moulded on the bearing member 50 and which is provided with a bearing opening 510 for holding a bearing bolt 45 of the locking pawl 4. See also the detailed illustration in FIG. 5.

Figure 5A:
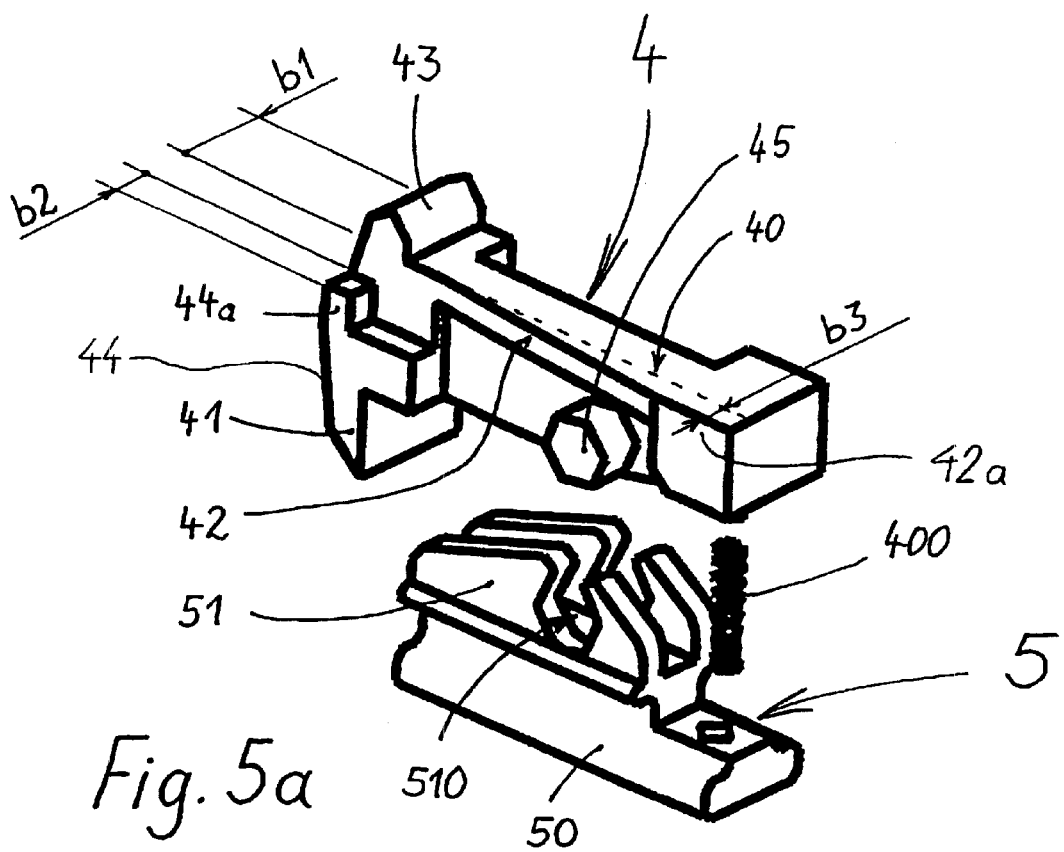
FIG. 5a shows an exploded view of a part of the locking device of FIG. 5.
Figure 5B:
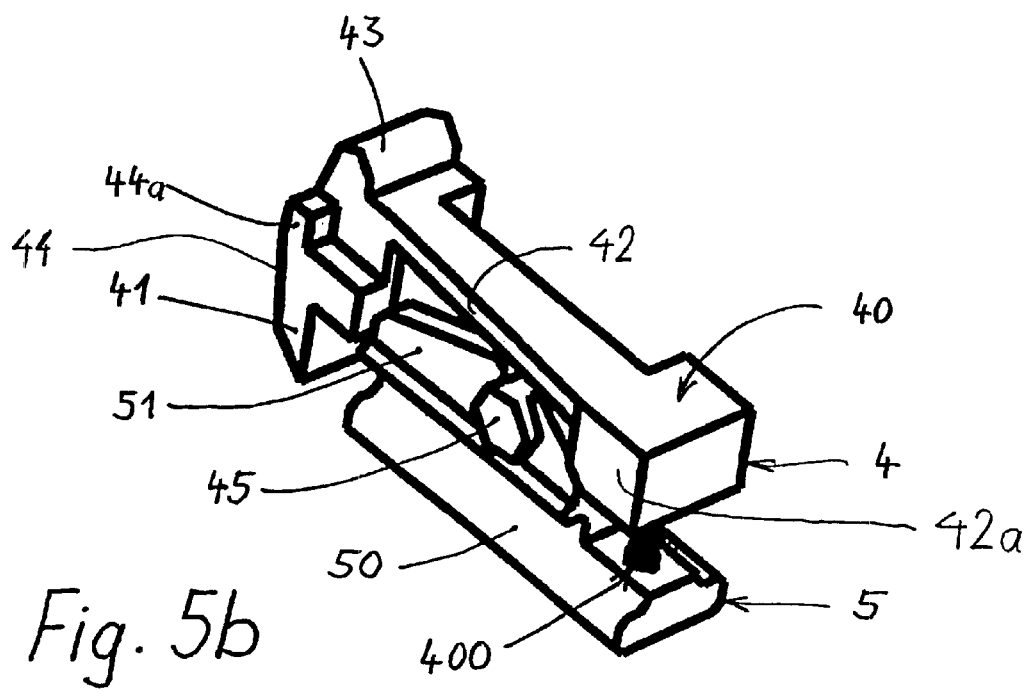
FIG. 5b shows a perspective view of a part of the locking device of FIG. 5.

The locking pawl 4 has, according to the embodiment shown in FIGS. 5*a* and 5*b*, at one end a detent element in the form of a detent nose or a detent hook 41 which can engage in detent openings 70 in the detent rail 7. The detent hook 41 is adjoined at the top by a counter stop 44 which can engage with a stop element 3 on the side of the seat frame (see FIG. 1 and 1*a*) in order to stop the seat frame during longitudinal adjustment in a predeterminable longitudinal position (memory position) by means of the memory device. Between the glide 5 and the locking pawl 4 is a compression spring 400 which is mounted at the end of the locking pawl 4 away from the detent hook 41 and by means of which the locking pawl 4 is elastically pretensioned so that its detent hook 41 has the tendency to engage in a detent opening 70 of the detent rail 7.

The other constituent parts of the locking pawl 4 which can be seen in FIGS. 5a and 5b will be explained further below in connection with FIGS. 1 to 4.

The stop element 3 on the seat frame side associated with the counter stop 44 of the memory device is attached to the seat rail 2 to swivel about an axis 30 and is pretensioned in the direction of the locking pawl 4 of the memory device by means of a torsion spring 300 which is mounted on the swivel axis 30 and whose one end 301 engages over a section of the stop element 3. The stop element 3 then lies with a slide stop 32a on a glide face of the detent rail 7.

On the other side, the stop element 3 is coupled to the backrest of the seat through a Bowden cable 21a, 21b whose Bowden tube 21a is supported on the Bowden suspension 21 and guides a cable 21b. The end of the cable 21b associated with the stop element 3 is thereby fixed on a cable suspension 31 of the stop element 3 which is spaced from the swivel axis 30. When the backrest is folded forwards the cable 21b becomes taut so that the stop element 3 swivels clockwise about the axis 30, namely so that its lower end moves away from the locking pawl 4, see FIG. 2.

The stop 32 provided at the lower end of the stop element 3 is however designed so that it can engage with the counter stop 44 of the memory device 4 both when the backrest is raised up (see FIGS. 1 and 1a) and when the backrest is folded forwards (see FIG. 2), whereupon movement of the seat rail 2 relative to the rail 1 on the bodywork side is stopped. Coupling of the stop element 3 (formed as a stop hook) with the backrest through the Bowden cable 21a, 21b is therefore not of importance for the memory function as such but rather with regard to the possibility of adjusting the memory position by sliding the locking pawl 4 and more particularly the counter stop 44 formed on the locking pawl.

In this respect it should be noted on the one hand that an upwardly protruding follower 43 moulded on the locking pawl 4 in the form of a projection only then engages with an associated engagement area 34 in the form of a recess of the stop element 3 when the backrest is folded up, thus the stop element is not swivelled by the Bowden cable 21a, 21b out from its normal position which is set by the pretension force of the torsion spring 300. Only in this state therefore can the locking pawl 4 be entrained during movement of the seat rail 2 along both directions in the longitudinal direction L of the seat since then the seat frame is in positive connection with the locking pawl 4 through the engagement area 34 of the stop element 3 and the follower 43.

On the other hand a switching spring 6 which is provided in the form of a shaping spring for switching the locking pawl 4 can only then act on the locking pawl 4 through an operating section in the form of an operating face 40 of the locking pawl when the backrest is not folded forwards, and the stop element 3 is thus in its normal position according to FIG. 1a.

Important constituent parts of the switching spring 6 are its upper leg 61 which runs substantially parallel to the longitudinal guide 1, 2 of the seat and engages underneath the operating lever 9, as well as a free end 60 of the switching spring 6 which runs substantially perpendicular to the upper leg 61 and which can act on the operating face 40 of the detent rocker 4.

Switching by means of the switching spring 6 takes place by swivelling the operating lever 9 clockwise downwards (namely either manually through an operating handle or by folding the backrest forwards through the Bowden cable 21c, 21d and the swivel lever 23), whereby the operating lever 9 acts on the upper leg 61 of the switching spring 6 so that the free end 60 of the switching spring 6 presses against the operating face 40 of the locking pawl 4. Since the operating face 40 is formed on the end of the locking pawl 4 opposite the detent hook 41 (see FIGS. 5a and 5b) the detent hook is hereby lifted out of the detent openings 70 of the detent rail 7 against the pretension of the compression spring 400. It is necessary for the torque exerted by the free end 60 on the operating face 40 to be greater than the torque produced by the pretension of the compression spring 400. The locking pawl 4 can then be moved on the glide 5 in the longitudinal direction L of the seat, more particularly can be adjusted together with the lower frame of the seat when the follower 43 of the locking pawl 4 engages in the engagement area 34 of the stop element 3.

Converting the action of the operating lever 9 on the upper leg 61 of the switching spring 6 into a movement of the lower free end 60 of the switching spring 6 towards the operating face 40 of the locking pawl 4 becomes possible through two stop pins 33, 35 of the stop element 3 which interact in a suitable way with the switching spring 6 so that this runs partially curved (approximately Z-shaped) in the end section angled away from the upper leg 61, and thereby changes into the lower free end 60.

A direct connection in the form of screw, rivet, welding, or adhesive connection can be provided as the connection between the operating lever 9 and the switching spring 6 or its upper leg 61. As an alternative, however, it is also possible to provide an indirect connection through further parts associated with the seat frame.

In the embodiment shown in FIG. 1, a positioning lock 33a is mounted on a stop pin 33 of the stop element 3 to prevent the switching spring 6 from slipping down sideways from the stop pins 33, 35.

In a modification of the embodiment illustrated in FIGS. 1 and 1a, the stop pins 33, 35 could each be mounted displaceable in a slide guide and moved directly by the Bowden cable 21a, 21b.

It should be pointed out that in the state illustrated in FIGS. 1 and 1a, the seat frame is located in its usual function position in which a passenger can take up his place on the vehicle seat. The backrest is thereby folded up or at least is not folded forwards towards the seat face so that neither the stop element 3 nor the operating lever 9 were swivelled by tightening of the Bowden cables 21a, 21b or 21c, 21d. The seat frame is moreover located in its memory position so that the stop element 3 is connected with the locking pawl 4 on one side through the stop 32 and the associated counter stop 44 and on the other side through the engagement area 34 and the associated follower 43. Since the operating lever 9 has also not been manually operated by its operating handle, both the fixing device 20 of the seat longitudinal guide 1, 2 and also the locking pawl 4 are each locked so that no movement of the seat frame or of the locking pawl can take place.

When in the state where the seat frame is locked in the memory position and the backrest of the seat is folded forwards towards its seat surface, the cables 21b, 21d of the two Bowden cable units 21a, 21b and 21c, 21d, respectively, become taut so that both the stop element 3 and also the swivel lever 23 are each swivelled clockwise about their relevant swivel axis 24 (see FIG. 1a).

The swivel movement of the stop element 3 thereby results in the engagement area 34 of the stop element 3 being lifted from the follower 43 of the locking pawl 4. Also, the two stop pins 33, 35 of the stop element 3 are moved upwards so that they act in a vertical direction on the upper leg 61 or on a spring section adjoining the free end 60. The stop pins 33, 35 serve as locking means which act on the switching spring 6 so that their free end 60 is prevented from exerting pressure in the vertical direction downwards onto the associated operating surface 40 of the locking pawl 4 in order to lift the detent hooks 41 out from the detent rail 7. This locking action does not occur if the backrest is located in its function position (thus is not folded forwards) since both stop pins 33, 35 are spaced sufficiently in the vertical direction from the switching spring 6.

The swivel movement of the swivel lever 23 in the clockwise direction causes a corresponding swivel movement of the operating lever 9 which in turn acts on one side on the operating element 20b of the fixing device 20 and on the other side on the upper leg 61 of the switching spring 6. The operation of the switching spring 6 thereby remains without any action since its free end 60 is then prevented by the stop pins 33, 35 from pressing onto the operating face 40 of the locking pawl 4.

The action of the operating lever 9 on the operating element 20b of the fixing device 20, on the other hand, has the effect that the fixing device becomes unlocked and the seat frame can now be moved forwards on the rail 1 which is fixed on the body (i.e. in the direction of the front floor fastening 10). Moving the seat frame backwards in the opposite direction is, however, not possible since such a movement would be blocked by the stop 32 of the stop element 3 and the associated counter stop 44 of the locking pawl 4.

The coupling described above and illustrated in FIG. 2 between the backrest and the fixing device 20 which, when folding the backrest forwards, leads to unlocking of the fixing device 20 is the basis of the easy entry function which allows simple sliding of the seat forwards with the backrest folded forwards in order to make it easier for a passenger to get into the back of a motor vehicle. The memory position defined by the position of the locking pawl 4 is hereby not changed since the detent hook of the locking pawl 4 engages as before in the detent rail 7 and moreover the follower 43 of the locking pawl 4 does not connect with the associated engagement area 34 of the stop element 3.

After the passenger has climbed into the back of the motor vehicle and the seat is pushed back again with the backrest folded forwards (or even with the backrest folded up), the seat frame is automatically stopped again in the memory position since the interaction of the stop 32 of the stop element 3 with the associated counter stop 44 of the locking pawl 4 prevents further movement of the lower frame of the seat relative to the rail 1 fixed on the body (on which the locking pawl 4 is locked through the detent rail 7). In this way, after executing the easy entry function, the previous seat position can be found again and set very quickly.

Figure 3:
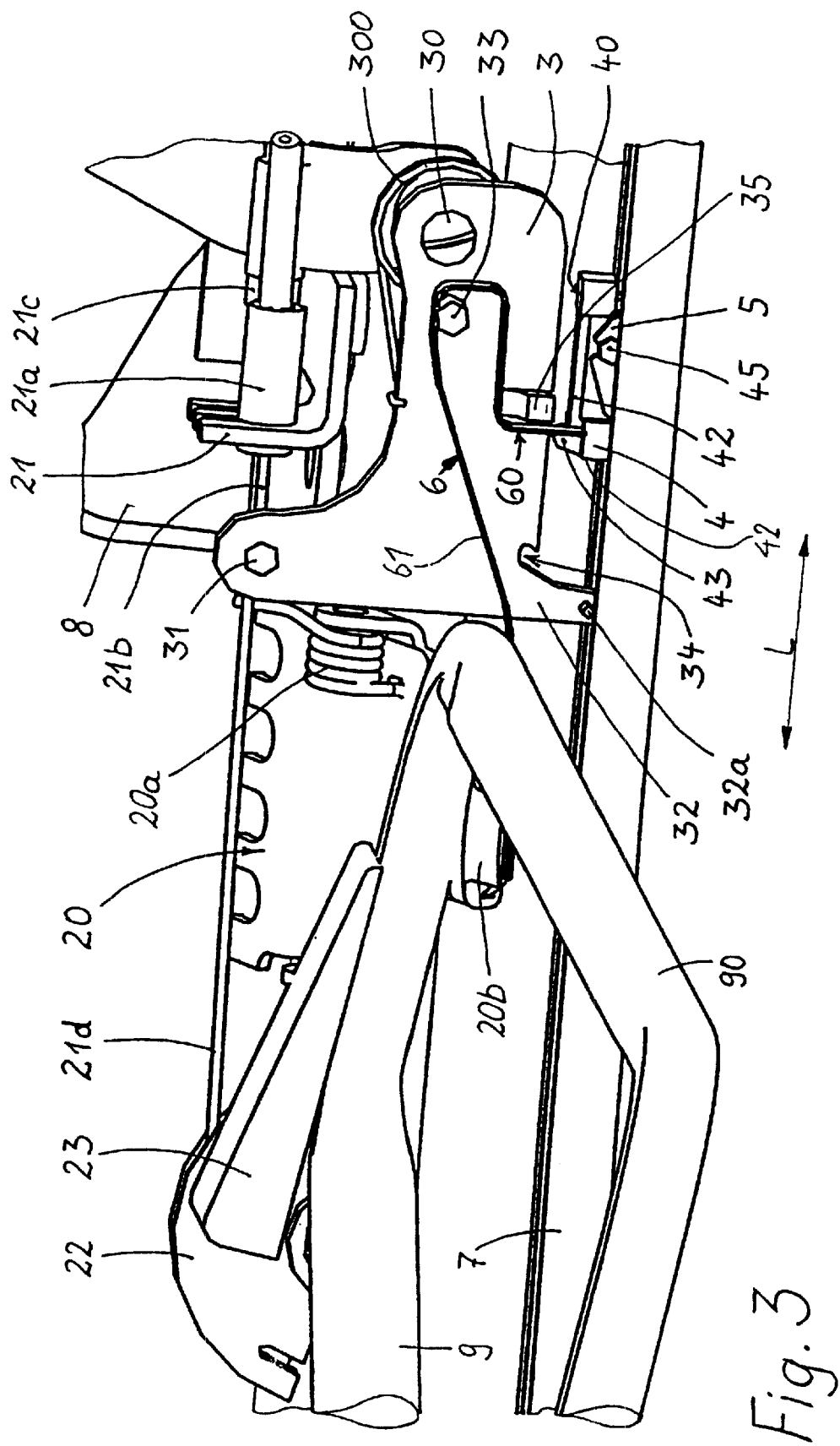
FIG. 3 shows a view according to FIG. 1a where the seat is located outside of its memory position and with the backrest raised up the fixing device for the longitudinal guide of the seat has been operated in order that the longitudinal position of the seat can be adjusted.
Figure 4:
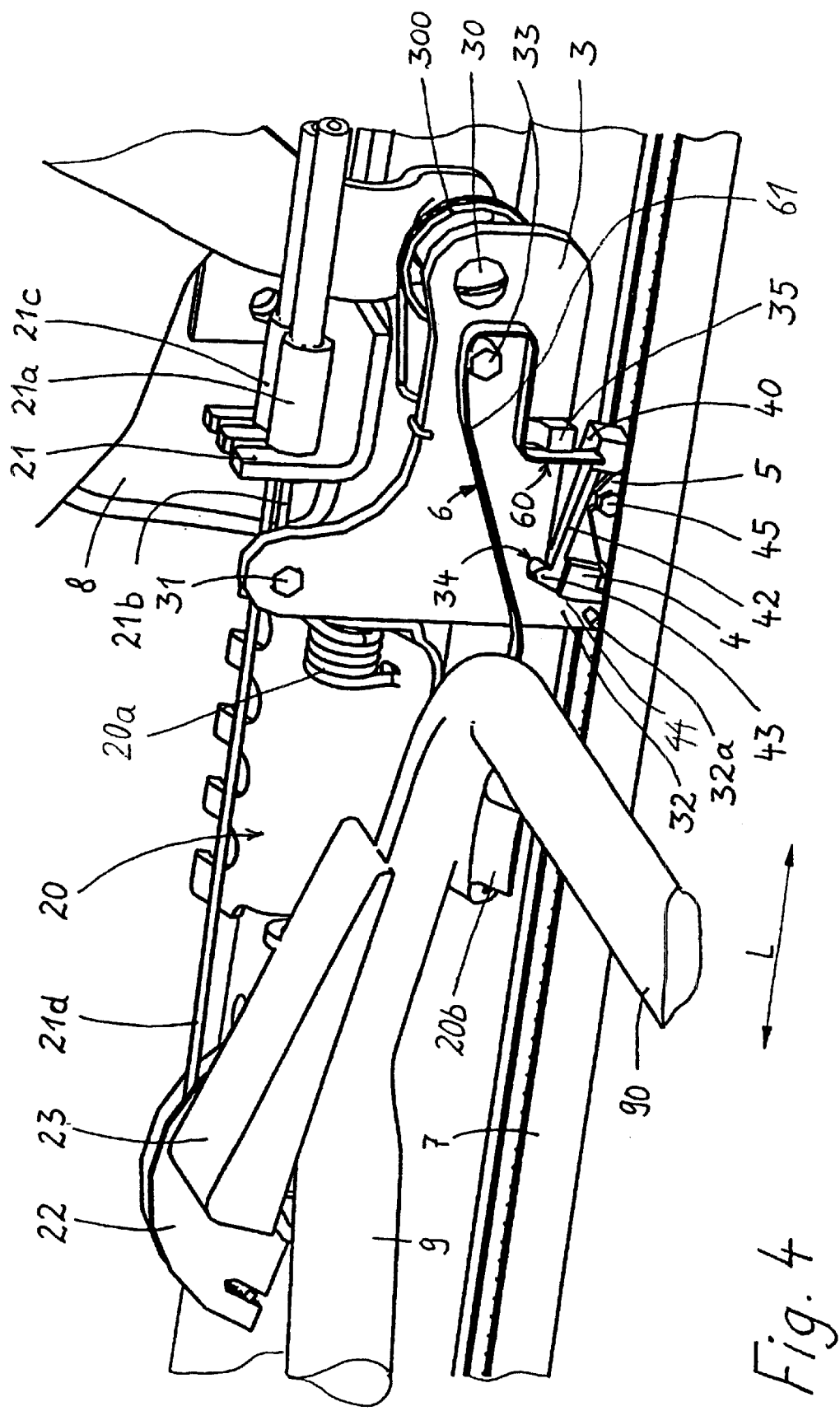
FIG. 4 shows a view according to FIG. 1a where the seat, with its backrest raised up, reaches its memory position.

FIG. 3 shows the seat frame in a situation where it has been pushed forwards in the longitudinal direction L of the seat relative to the rail fixed on the body (i.e. towards the front floor fastening 10 according to FIG. 1). The backrest is hereby not folded forwards but is located in its function position so that the stop element 3 is not swivelled.

At the same time, however, the operating lever 9 is manually operated through an operating handle so that it acts both on the operating element 20b of the fixing device 20 and also on the upper leg 61 of the switching spring 6. The fixing device 20 is hereby unlocked whilst the switching spring 6 (whose free end 60 is moved vertically downwards as a result of the action of the operating lever 9 on the upper spring leg 61) does not influence the state of the locking pawl 4 of the memory device. Since the seat frame is not located in its memory position, the free end 60 of the switching spring cannot act on the associated operating face 40 of the locking pawl 4.

In this situation where the fixing device 20 is unlocked, the seat frame can now be selectively moved forwards or backwards whereby the memory position is again not affected. The possible displacement of the seat frame towards the back (i.e. in the direction of the rear floor fastening 11 according to FIG. 1) is thereby restricted in that the stop 32 of the stop element 3 finally comes into contact with the counter stop 44 of the locking pawl 4. A further movement of the seat frame backwards is hereby blocked.

In the illustrated state shown in FIG. 3, where the seat is located outside the memory position (namely, has been moved forwards) and with its backrest folded up, if the operating lever 9 is released, then, as a result of the action of the spring assembly 20a of the fixing device 20, its operating element 20b as well as the operating lever 9 swivel back again into their starting position. The fixing device 20 is hereby locked so that the seat frame is locked in the corresponding seat longitudinal position relative to the rail on the body side. This possibility of locking the seat frame outside of the memory position therefore exists because when the backrest is raised up the coupling means (Bowden cable 21c, 21d) through which the fixing device 20 is coupled to the backrest are brought into a state (the cable 21d of the Bowden cable unit 21c, 21d is no longer taut) in which they do not counteract locking of the fixing device 20.

On the last part of the adjusting path of the seat frame towards the back, the free end 60 of the switching spring 6 is guided on an inclined guide 42 of the locking pawl 4 running at an acute angle to the longitudinal direction L of the seat so that it cannot act on the operating face 40 of the locking pawl 4. This inclined guide 42 of the locking pawl 4 can be clearly seen from the detailed illustration in FIG. 5a. Obviously the inclined guide 42 can also be replaced by other e.g. sliding or swivelling means which are to prevent the free end 60 of the switching spring 6 from acting on the operating face 40 of the locking pawl 4.

So that the free end 60 of the switching spring 6 (see FIG. 3) can be guided along the inclined guide 42 when the seat frame is moved backwards towards the memory position, the free end 60 of the switching spring must be designed so that it only covers a part of the overall width b1+b2 (extension across the longitudinal direction of the seat) of the locking pawl 4, namely, at maximum only such a part of the width b1+b2 which corresponds to the width b2 of a free cut section at the front end of the locking pawl 4. This free cut section of the width b2 at the front end of the locking pawl 4 is adjoined by the inclined guide 42 which runs inclined to the longitudinal direction of the seat so that the width of the locking pawl 4 in the region of the inclined guide 42 increases towards the back, namely, by a value b3 which corresponds roughly to the width b2 of the free cut section at the front end (on the side of the detent hook or stop).

In one embodiment, a stop 44a projects into the free cut section of the locking pawl 4 above the detent hook 41 and can enter into engagement with the free end 60 of the switching spring 6 if the locking pawl 4, owing to the presence of the detent hook 41 between two detent openings 70 of the detent rail 7, could not swivel fully into its detent position and the seat is pushed forwards with the backrest folded forwards.

On reaching the memory position, the free end 60 of the switching spring is then supported at the side (i.e. horizontally and across the longitudinal direction of the seat) on an end section 42a of the locking pawl 4 adjoining the inclined guide 42. The free end 60 of the switching spring 6 hereby also on reaching the memory position of the seat frame does not move into contact with the operating face 40 at the rear end of the locking pawl 4 but initially adjoins the adjoining side section 42a of the locking pawl 4 and is supported on the same. The free end 60 of the switching spring 6 can thereby not spring onto the operating face 40 of the locking pawl 4 since the free end 60 is pretensioned downwards so long as the operating lever 9 is acting on the upper leg 61 of the switching spring 6, i.e. so long as the operating lever 6 is manually swivelled in the clockwise direction.

If after reaching the memory position the operating lever 9 is again released by the seat user, then, as a result of the action of the spring assembly 20a of the fixing device 20, its operating element 20b as well as the operating lever 9 again swivel back to the starting position. Thus, on the one hand, the fixing device 20 is hereby locked, and on the other hand, the free end 60 of the switching spring 6 is released so that it springs onto the operating face 40 of the detent rocker 4.

If in the memory position of the seat frame and the operating lever 9 is again swivelled (in the clockwise direction) by means of an operating handle, then not only is the fixing device 20 unlocked, but at the same time, the free end 60 of the switching spring 6 presses vertically onto the operating face 40 of the locking pawl 4. This causes the detent hook 41 of the locking pawl 4 (see FIG. 5) to be lifted out of the detent openings 70 of the detent rail 7 and the locking pawl 4 to be no longer locked relative to the detent rail 7, and also causes the follower 43 to engage in the engagement area 34 of the stop element 3.

With the fixing device 20 unlocked, if the seat frame is moved in the longitudinal direction of the seat, forwards or backwards, relative to the rail 1 fixed on the body floor, the locking pawl 4 is automatically entrained. The transfer of force from the lower frame of the seat to the locking pawl 4 thereby takes place over the engagement area 34 of the stop element 3 in which the follower 43 of the locking pawl 4 engages. The positive connection between the follower 43 and the engagement area 34 would thereby be produced by the locking pawl 4 swivelling under the action of the free end 60 of the switching spring 6.

If the adjusting movement of the seat frame is terminated and the operating handle of the operating lever 9 is therefore released, then the operating element 20b and the operating lever 9 thus swivel back into their starting position under the action of the spring assembly 20a of the fixing device 2. On the one hand, the fixing device 20 is again locked so that the seat longitudinal guide is locked, and on the other hand, the free end 60 of the switching spring 6 no longer presses on the operating section 40 of the locking pawl 4. This therefore moves under the action of the compression spring 400 back into its locked position in which the detent hook 41 (see FIG. 5) engages in a detent opening 70 of the detent rail 7.

Thus, the seat is then again located in the functioning position shown in FIG. 1 and FIG. 1a with the fixing device locked and with the memory device locked in the memory position.

A further embodiment of the invention will now be described with reference to FIGS. 6 to 10 in which those functional groups of the seat frame which agree with those already explained with reference to FIGS. 1 to 5 will not be discussed in further detail. The correlation between corresponding functional groups of FIGS. 1 to 5 on the one hand and FIGS. 6 to 10 on the other is made easier in that the corresponding reference numerals of FIGS. 1 to 5 are used in FIGS. 6 to 10 but increased by a value of 100.

A noticeable difference between FIGS. 1 to 5 on one hand and FIGS. 6 to 10 on the other is initially that a driver seat is shown in FIGS. 1 to 5 whilst FIGS. 6 to 10 show parts of a passenger seat. Consequently, in the front views according to FIGS. 6 to 10 the right side edge of the page corresponds to the front part of the seat and the left side edge of the page corresponds to the rear part of the seat.

Figure 6:
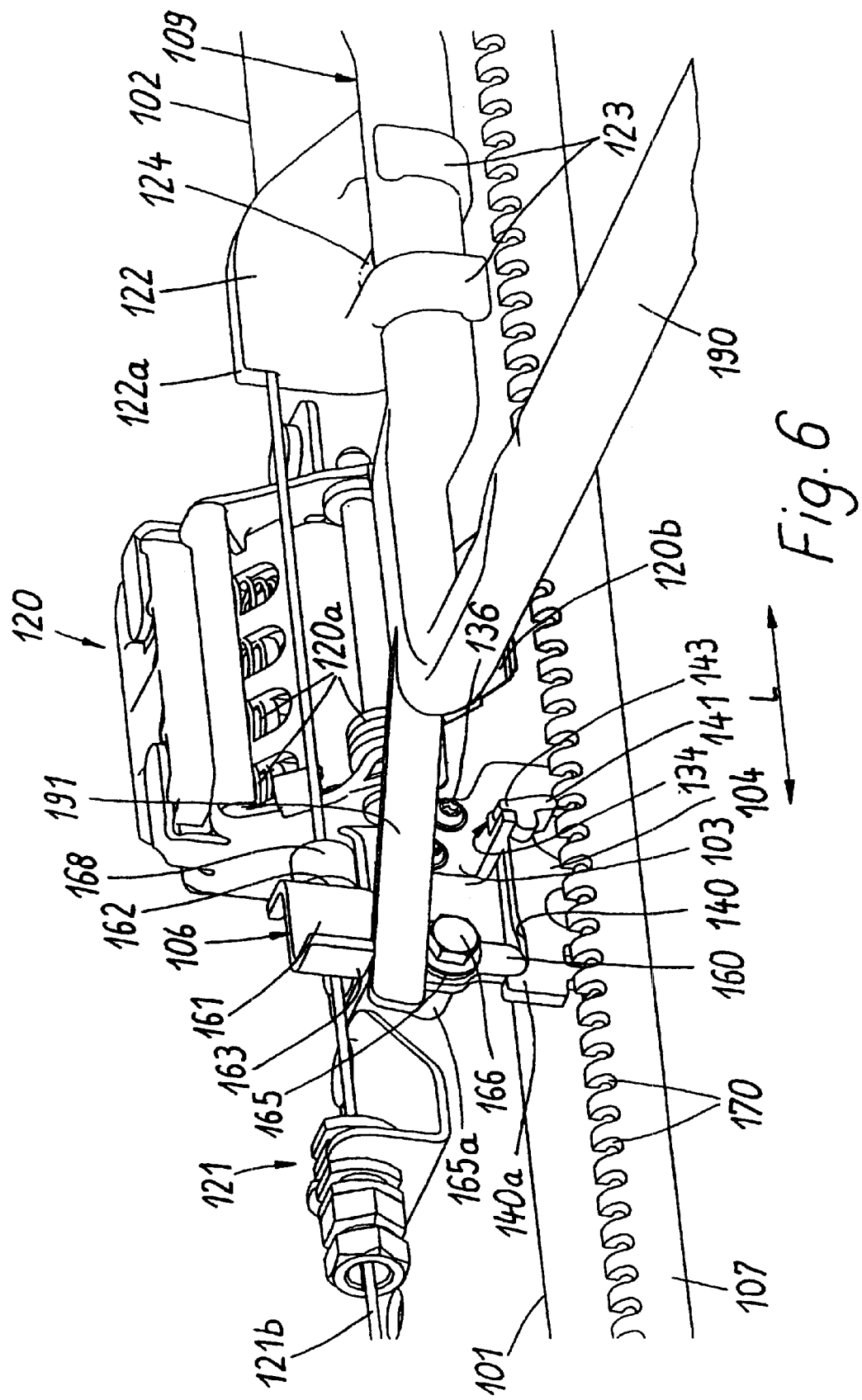
FIG. 6 shows a perspective view of a first modification of the embodiment of FIGS. 1 to 5 where the seat, with the backrest folded up, is locked in its memory position.

In the perspective front view according to FIG. 6, as well as the associated rear view according to FIG. 6a, there is a rail 101 fixed on the body and a seat rail 102 movable thereon in the longitudinal direction L of the seat, with a detent rail 107 which is fixed on the rail 101 fixed on the body having several detent openings 170 arranged in succession in the longitudinal direction L of the seat. The seat rail 102 supports the remaining components of the seat frame (see FIG. 20).

The seat rail 102 is lockable relative to the rail 101 fixed on the body by means of a fixing device 120 which corresponds in construction to the fixing device 20 explained with reference to FIG. 1. This fixing device 120 can be unlocked through a swivel operating element 120b which is resiliently pretensioned by a spring assembly 120a against the direction along which it has to be swivelled for the purpose of unlocking the fixing device 120.

In order to unlock the fixing device 120, the operating element 120b can be operated on one side by a seat user directly by seizing an operating lever 109 through an operating handle provided for this (not shown in FIGS. 6 and 6a) wherein the lever is attached for swivel movement on the seat frame and has a transverse tube 190. The seat user swivels the operating handle counterclockwise so that the operating element 120b is moved down against the pretension of the spring assembly 120a. On the other hand, the fixing device 120 can also be unlocked by folding the seat backrest forwards for which purpose the seat backrest is coupled to the operating lever 109 through a Bowden cable unit which has a cable 121b with its Bowden (not shown) supported on a Bowden support 121. Furthermore, a gearing part 122 which has a guide 122a as well as a suspension mounting 122b for the cable 121b of the Bowden cable unit is mounted on the swivel axis of the operating lever 109 by means of an axle shaft 124. The gearing part 122 converts the tightening of the cable 121b, which occurs as the backrest is folded forwards, into a swivel movement which in turn is transferred to the operating lever 109 by two arms 123 of the gearing which engage round said operating lever 109. The operating lever 109 is hereby swivelled clockwise (with respect to FIG. 6a) when the backrest is folded forwards, and unlocks the fixing device 120 through the operating element 120b.

Furthermore, a cable nipple 168 is fixed, e.g. by squashing, on the cable 121b of the Bowden cable between the Bowden support 121, which is fixed on the seat rail by means of a fastening plate 121a, and the gearing 122. The cable nipple 168 is associated with a switching element in the form of a switching lever 106 which is mounted by means of a bearing bush 165, a stepped bolt 165a as well as a screw 166 to swivel about an axis formed by the longitudinal axis of the stepped bolt 165a, and at the same time is fixed on the seat frame or its seat rail 102. The switching lever 106 has in its upper section 161 a stop 162 which is mounted directly adjoining the cable nipple 168 and on which the cable nipple 168 can act in the longitudinal direction of the seat whereby the switching lever 106 is swivelled.

The second end section of the switching lever 106 which is mounted underneath the bearing bush 165 as well as the stepped bolt 165a forms an operating section 160 which is associated with an operating section of a locking pawl 104 of the memory device. The operating section of the locking pawl 104 is thereby formed by an operating face 140 on the top side of the locking pawl.

The switching lever 106 is currently locked by a projection 191 of the operating lever 109 on which the upper section 161 of the switching lever 106 is vertically supported (across the longitudinal direction L of the seat) with a stop 163, in the position shown in FIGS. 6 and 6a in which its operating section 160 acts on the operating face 140 of the locking pawl 104. The torque required for this is applied by the spring assembly 120a of the fixing device 120 which acts on the lever projecting 191 through the operating element 120b as well as the operating lever 109.

In another embodiment, the perpendicular position of the switching lever 106 can also be assisted by a spring mounted directly on the switching lever 106 or in that the switching lever 106 is mounted with sufficient friction which cannot be overcome by the action of the compression spring 400 of the locking pawl 104.

The locking pawl 104 itself is, as can be seen, in particular, from FIG. 6a, mounted for swivel movement on the bearing pin 155 of a glide 105 which is guided with a base body 150 in the longitudinal direction L of the seat movable next to the detent openings 170 of the detent rail 107. The glide has in its base body 150 a recess 152 in which a compression spring 400 is mounted which, underneath the operating section 140 of the locking pawl 104, acts on the latter and thereby pretensions the locking pawl 104 so that a detent hook 141 mounted on the other end of the locking pawl 104 has the tendency to engage in the detent rail 107. However, in the state illustrated in FIGS. 6 and 6a where the seat is locked in the memory position with the backrest not folded forwards, the locking pawl is prevented from doing this in that the operating section 160 of the switching lever 106 is supported on the operating face 140 of the locking pawl 104 so that the latter cannot swivel about the bearing pin 155 in order to bring the detent hook 141 into engagement with the detent rail 107.

In the state illustrated in FIGS. 6 and 6a, a counter stop 144 of the locking pawl 104 is furthermore located in contact with a stop 132 of a stop element 103 which is fixed by fastening screws 136 on the seat rail 102. Furthermore, a follower 143 of the locking pawl 104, which adjoins the stop 144 towards the top, is in engagement with an engagement area 134 of the stop element 103.

In short, some differences between the embodiment according to FIGS. 1 and 1a and the embodiment according to FIGS. 6 and 6a include:

a) with the present embodiment, only one Bowden cable is provided which when the backrest is folded forwards serves both to operate the fixing device and to act on the memory device;

b) with the present embodiment, regarding the switching means, which can act on the memory device for the purpose of unlocking or locking, there is no switching spring but a switching lever; and c) with the present embodiment, when locking the seat in the memory position with the backrest raised up, the memory device is not locked, but rather unlocked.

In the state of the seat illustrated in FIGS. 6 and 6a, where the seat is locked in the memory position, if the backrest is folded forwards, then the cable 121b of the Bowden cable is tensioned and moved towards the rear seat end (on the side of the backrest). Referring to FIG. 7, on the one hand, the operating lever 109 is swivelled counterclockwise through the gearing part 122 and the arms 123, whereby it acts on the operating element 120b and unlocks the fixing device 120. On the other hand, the cable nipple 168, which is squeezed onto the cable 121b, is moved towards the rear seat end and thereby acts on the stop 162 in the upper section 161 of the switching lever 106. The switching lever 106 is thereby swivelled counterclockwise whereby its operating section 160 is lifted from the associated operating face 140 of the locking pawl 104.

This swivel movement of the switching lever 106 is possible since this is no longer blocked by the lever projection 191 which would indeed swivel downwards together with the operating lever 109. Since the switching lever 106 has released the locking pawl 104, the locking pawl 104 now swivels, as a result of the action of the compression spring 400 (see FIG. 6a), about the bearing pin 155 of the glide 105 until the detent hook 141 engages in an opening 170 of the detent rail 107. The locking pawl 104 and, thus overall, the memory device is hereby locked.

The swivel movement of the locking pawl 104 furthermore has the result that the follower 143 of the locking pawl 104, as well as the engagement area 134 of the stop element 103, comes out of engagement. This is necessary in order to be able to move the seat frame, since otherwise, a movement of the seat would be blocked by the locked memory device.

The cable nipple 168 thereby serves here as a locking means which, when the backrest is folded forwards, acts on the switching lever 106 so that the locking pawl 104 cannot be unlocked by means of the switching lever 106.

The assembly is designed so that when folding the backrest forwards, the detent hook 141 can engage under the action of the compression spring 400 in a detent opening 170 before the fixing device 120 is unlocked so far that the seat rail 102 can be displaced relative to the rail 101 fixed on the body. A reliable storage of the actual seat longitudinal position is hereby guaranteed as the memory position. Insofar as the detent hook 141 cannot in any case engage directly in a detent opening 170 because the seat is positioned so that the detent hook 141 under the action of the compression spring 400 strikes against a web between two detent openings 170, then the detent hook 141 only engages in the next detent opening 170 which it passes after a slight displacement of the seat frame in the longitudinal direction L of the seat. In such a case, there thus arises a slight deviation between the longitudinal position of the seat when the backrest is folded forwards and the then stored memory position.

In the state illustrated in FIG. 7, which was reached by folding the backrest forwards, the seat frame can now be pushed forwards in the longitudinal direction L of the seat with the backrest folded forwards in order to make it easier for a passenger to get into the back of a vehicle or to place an article into the back of the vehicle.

If the seat is then moved back again with the backrest still folded forwards it is automatically stopped at the latest in the memory position defined by the locking pawl 104. Upon reaching the memory position, the stop 132 of the seat frame moves into contact with the stop 144 of the memory device whereby further movement of the seat frame backwards is prevented.

If the backrest is again folded back into its function position, then the tension of the cable 121b is loosened and the switching lever 106, as well as the operating lever 109 with the projection 191 fixed thereon, returns to the position illustrated in FIGS. 6 and 6a. If the operating lever 109 is swivelled counterclockwise in order to unlock the fixing device 120, the position is reached which is shown in FIG. 8.

When manually swivelling the operating lever 109 by means of the operating handle provided for this purpose, the fixing device 120 is indeed unlocked through the operating element 120b so that the seat frame can be moved in the longitudinal direction L of the seat on the rail 101 which is fixed on the vehicle body; but, as opposed to folding the backrest forwards, here the switching lever 106 remains in its vertical position in which its operating section 160 acts vertically on the operating face 140. This prevents the locking pawl 104 from becoming unlocked through the action of the compression spring 400.

Figure 8:
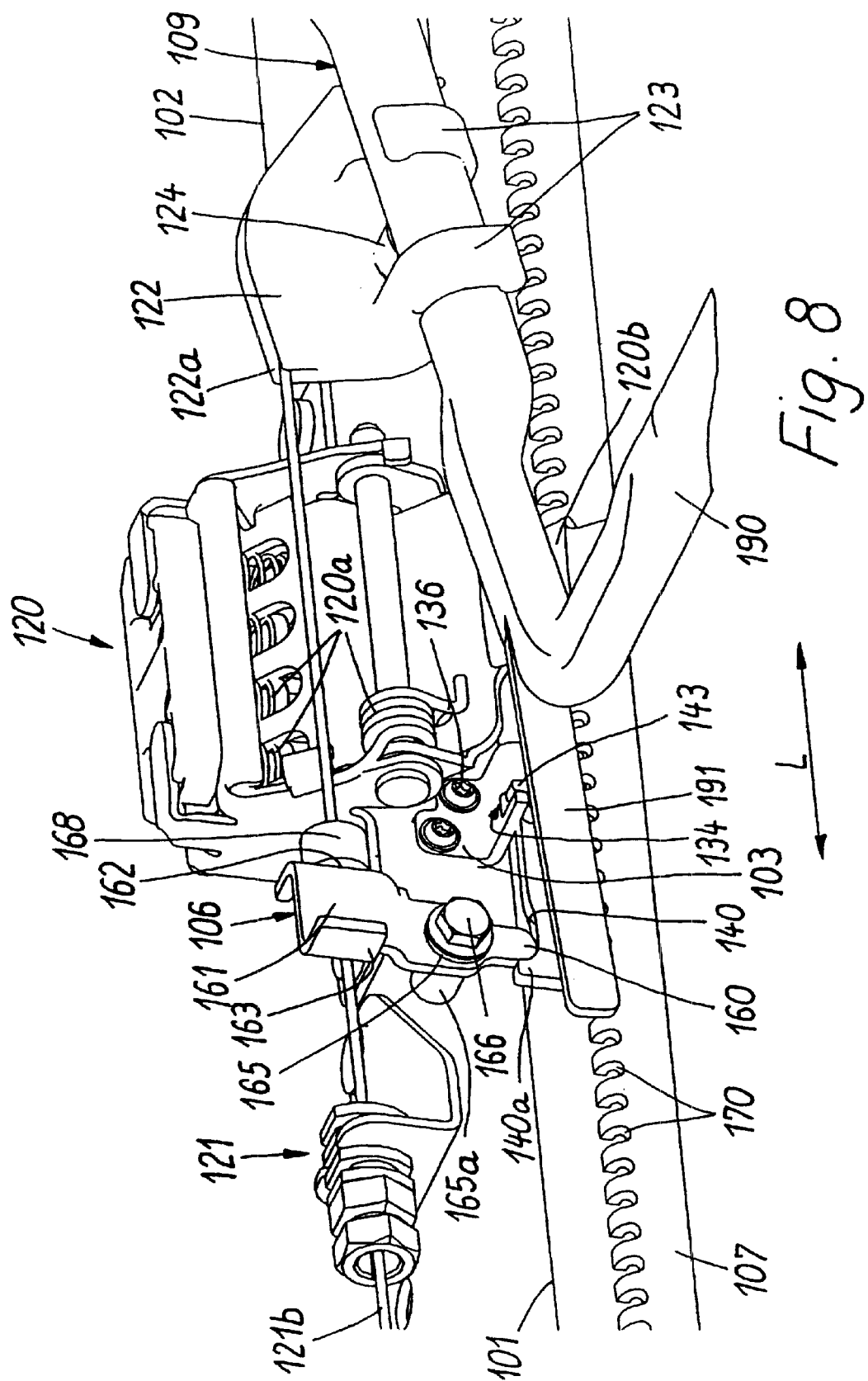
FIG. 8 shows a view according to FIG. 6 where, with the backrest folded up in the memory position, an operating lever has been activated in order to reset the memory position.

Owing to the lever projection 191 which is swivelled downwards, according to FIG. 8, and which consequently does not adjoin the associated stop 163 of the switching lever 106, the vertical position of the switching lever 106 must be secured for example by a suitable formation of the operating face 140 of the locking pawl 104. The operating face 140 can for this purpose be curved so that under the action of the compression spring 400 of the locking pawl 104 on the operating section 160 of the switching lever 106, it exerts no moment which would result in the swivel movement of the switching lever 106 in the counterclockwise direction. In other words, the interaction of the operating face 140 of the locking pawl 104 with the operating section 160 of the switching lever 106 must be designed so that the forces introduced by means of the compression spring 400 from the locking pawl 104 do not trigger any swivel movement of the switching lever 106 a counterclockwise direction. A swivel movement of the switching lever 106 in the clockwise direction is, however, blocked by the cable nipple 168.

Alternatively, the vertical position of the switching lever 106 can, as already mentioned above, also be secured by means of a suitable spring element or by sufficiently great friction forces.

In short, the operation of the operating lever 109 in the memory position of the seat (with the backrest not folded forwards) leads, on the one hand, to the fixing device 120 becoming unlocked while at the same time, the locking pawl 104 and thus the memory device as a whole remain in the unlocked state which already existed before swivelling the operating lever 109 (see FIGS. 6 and 6a). Moreover, the follower 143 of the memory device engages in the engagement area 134 of the stop element 103 on the seat rail side.

In this state, movement of the seat frame in the longitudinal direction L of the seat leads to the locking pawl 140 being entrained at the same time so that during displacement of the seat, a new memory position is also set at the same time. The newly set memory position which corresponds to the longitudinal position of the seat, which is newly set when displacing the seat frame, is, however, not then locked if the operating lever 109 is let go at the end. For this has, according to FIGS. 6 and 6a, at first, only the result that the fixing device 120 is locked and thus the seat rail 120 is locked relative to the rail 101 fixed on the body. Locking of the memory device however only then takes place, according to FIG. 7, if the seat back is folded forwards in the new longitudinal position of the seat. Thus, with the present embodiment, the memory device is always only then locked when the seat is moved forwards with the backrest folded forwards within the scope of the easy-entry function.

Figure 9:
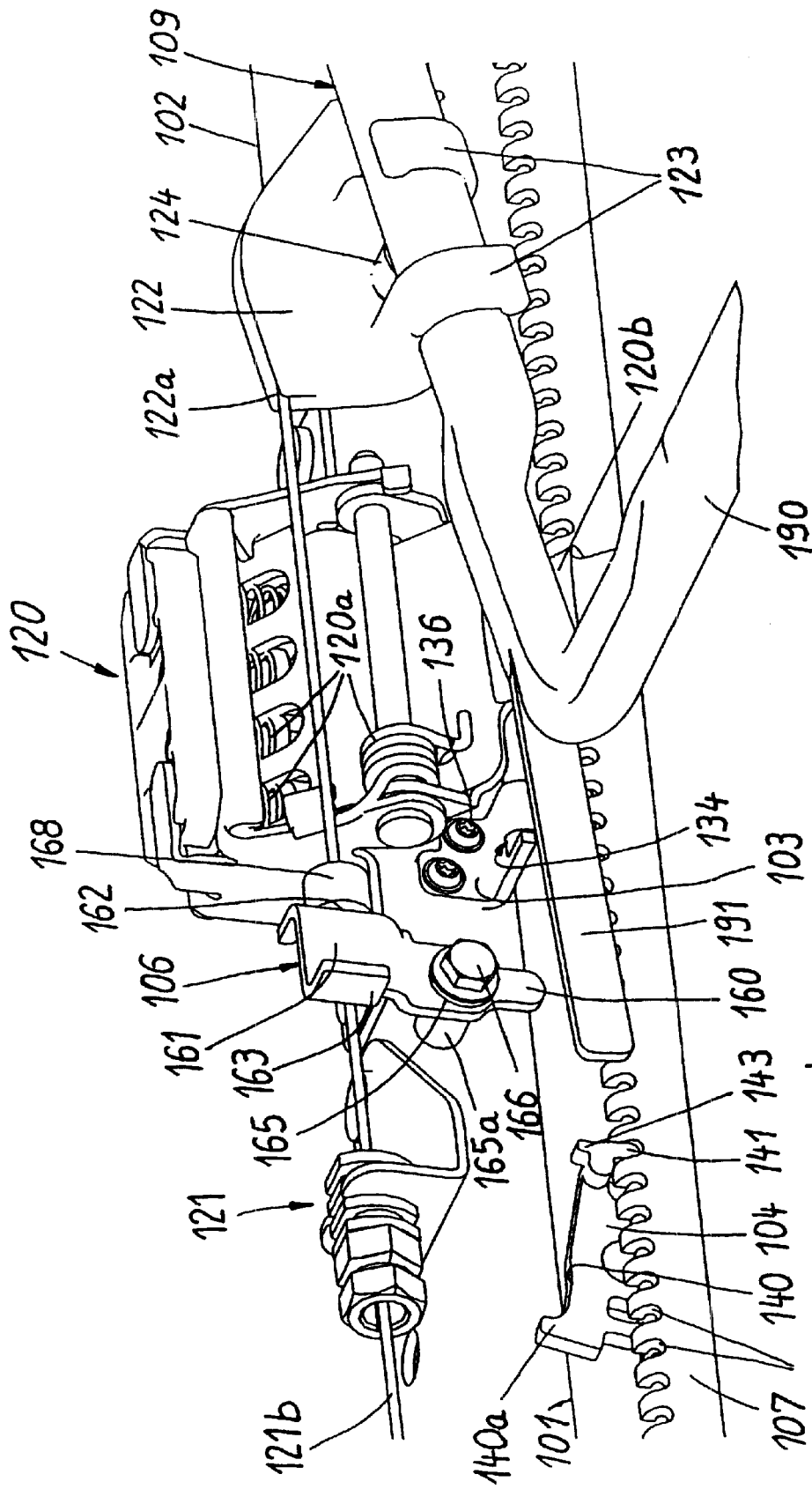
FIG. 9 shows a view according to FIG. 6 where the memory position of the seat is approached with the backrest folded up.

According to the embodiment shown in FIG. 9, the seat frame is shown where it has first been moved forwards in the longitudinal direction L of the seat with the backrest folded forwards whereby the locking pawl 104 has been left locked in the original seat position, and where then the backrest was folded back into its function position. Furthermore, the operating lever 109 is swivelled so that the fixing device 120 is unlocked and the seat frame can be moved selectively forwards or back in the longitudinal direction of the seat. In each longitudinal position of the seat which is thereby reached, the seat frame can be locked relative to the rail 1 fixed on the body by means of the fixing device 120 by letting go of the operating lever 109.

Figure 10:
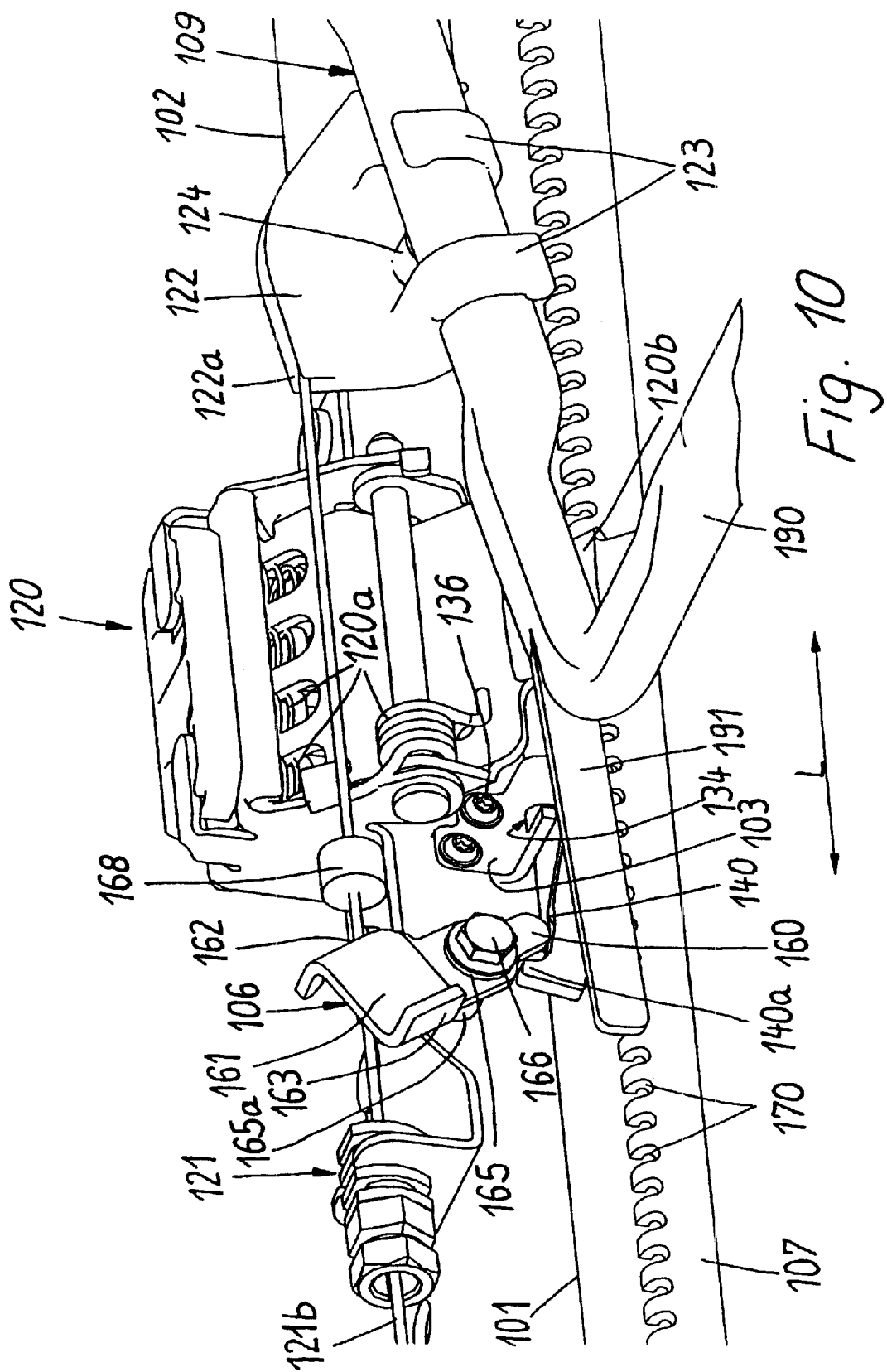
FIG. 10 shows a view according to FIG. 6 where the memory position of the seat is reached with the backrest folded up.
Figure 11A:
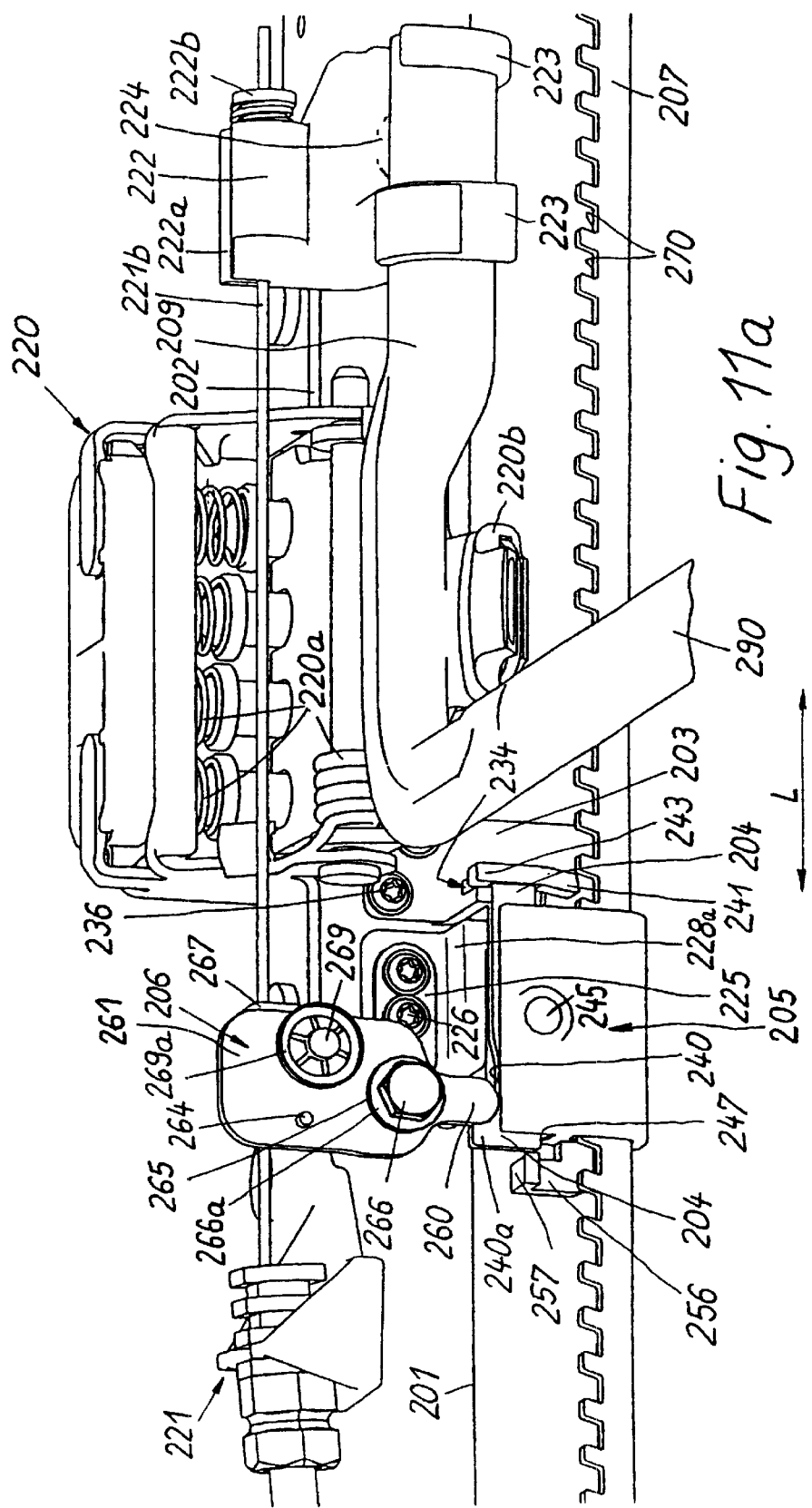
FIG. 11a shows a second modification of the embodiment from FIGS. 1 to 5 where the seat is locked with the backrest raised up in the memory position.
Figure 11B:
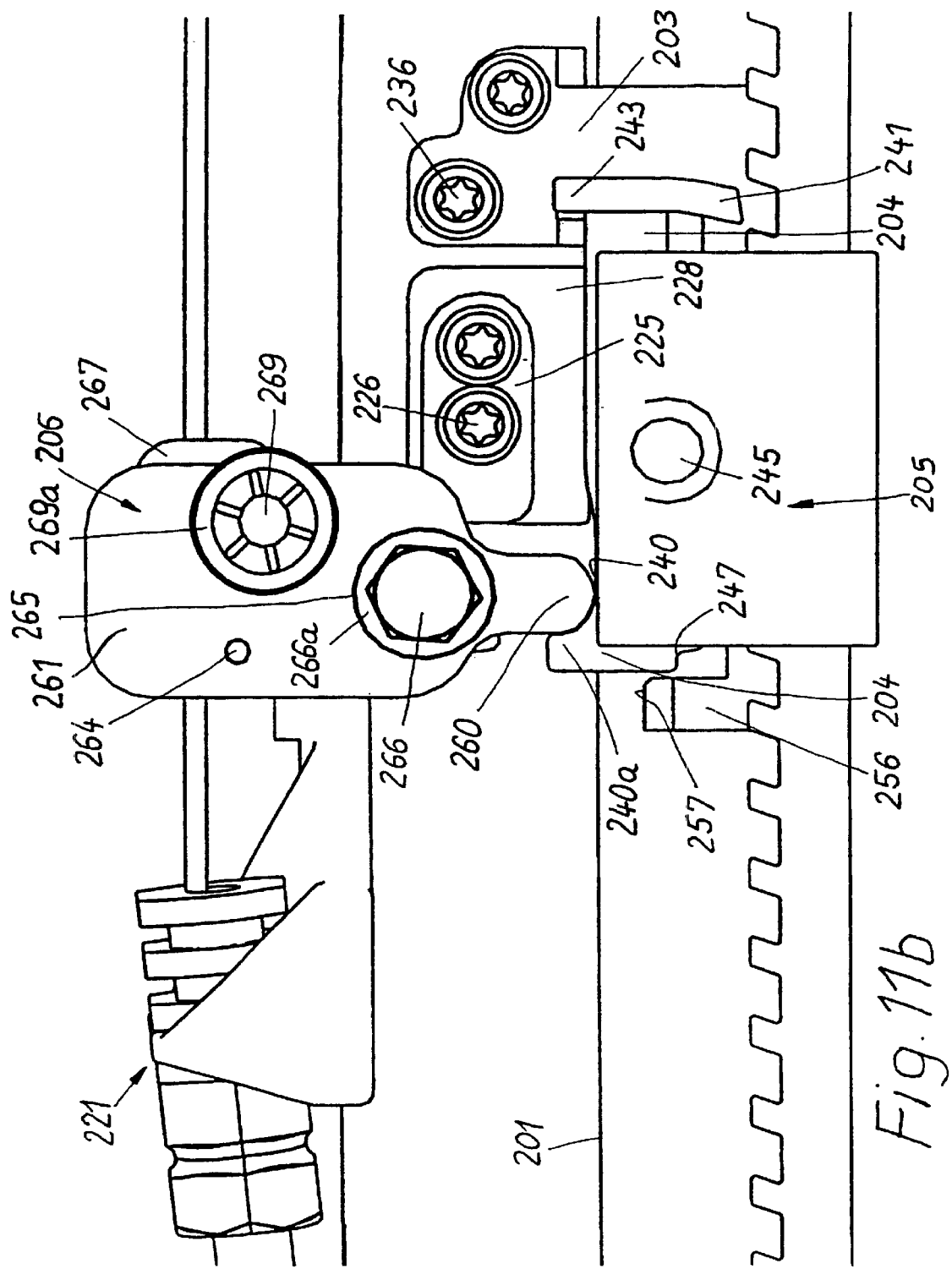
FIG. 11c shows a rear view of the illustration of FIG. 11a without the rails of the longitudinal guide of the seat.
FIG. 11d shows a rear view of the illustration of FIG. 11a without the rails of the longitudinal guide of the seat and without a glide of the memory device.
Figure 11D:
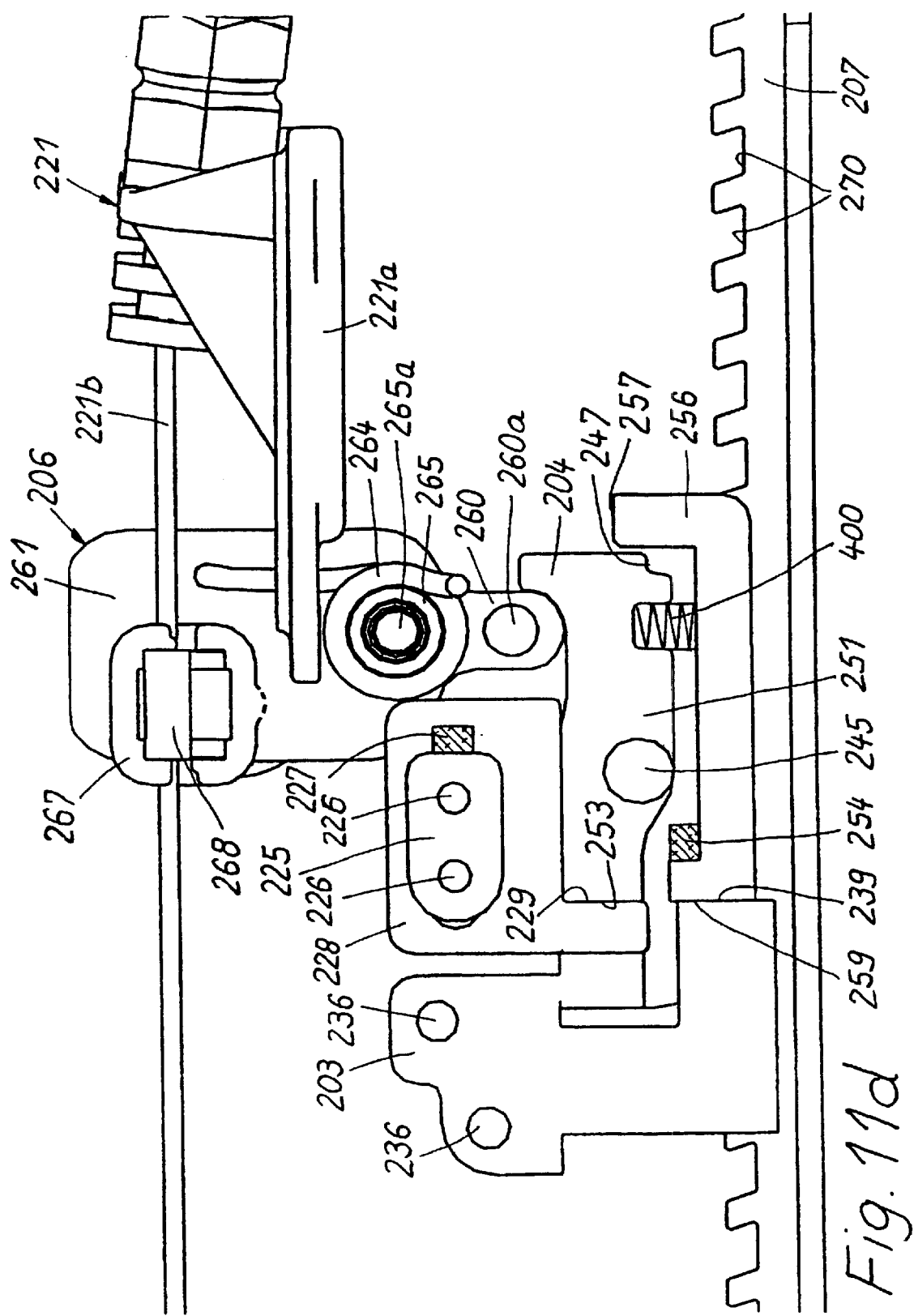

According to the embodiment shown in FIG. 10, the state of the seat frame is shown when the seat frame is moved back into the memory position with the backrest upright. Here, the switching lever 106 strikes with its operating section 160 against a projection 140a which projects vertically up from the operating face 140 of the locking pawl 104. This is due to the fact that the locking pawl 104 is located in the locked state in which it engages by its detent hook 141 (see FIG. 6a) in a detent opening 170 of the detent rail 107. Through the associated inclined position of the operating face 140 of the locking pawl 104, the locking pawl exerts on the operating section 160 of the switching lever 106 a torque with a component parallel to the longitudinal direction L of the seat. As a result the switching lever 106 is swivelled counterclockwise and its operating section 160 engages with the projection 140a of the locking pawl 104. This causes the locking pawl 104 to remain locked when the lower frame of the seat reaches the memory position shown in FIG. 10.

In short, the operating face 140, therefore, interacts in the locked state of the locking pawl 104 with the operating section 160 of the switching lever 106 so that this is swivelled when the seat is pushed into the memory position with the backrest upright whereby unlocking of the locking pawl 104 is prevented. (If the seat is pushed back into the memory position with the backrest folded forwards, then the switching lever 106, as a result of the action of the cable nipple 168, is swivelled in any case (see FIG. 7) so that also in this case no unlocking of the memory device can take place). On the other hand, the operating face 140 of the locking pawl 104 and the operating section 160 of the switching lever 106 interact in the unlocked state of the locking pawl 104 (see FIG. 6) so that the locking pawl 104 remains unlocked, as was explained in further detail above with reference to FIG. 6.

As a result of the locked state of the locking pawl 104, the seat frame, on reaching the memory position, is automatically stopped when the stop 132 of the stop element 103 on the seat frame side becomes blocked with the counter stop 144 of the memory device (see FIG. 6a).

In the memory position, if the operating lever 109 is released, it swivels clockwise under the action of the spring assembly 120a of the fixing device 120 until the fixing device 120 is again locked. At the same time, through the projection 191 of the operating lever 109, which acts on the angled stop 163 in the upper section 161 of the switching lever 106, the switching lever 106 is swivelled clockwise into its vertical position where the switching lever 106 acts by its operating section 160 on the operating face 140 of the locking pawl 104 and unlocks this against the action of the compression spring 400 (which requires a corresponding design of the spring assembly 120a). This seat is then again located in the memory position in the position explained with reference to FIGS. 6 and 6a with the backrest raised up.

Another embodiment of the invention will now be described with reference to FIGS. 11a to 19, wherein only those function groups will be explained in detail where they differ from those illustrated in FIGS. 6 to 10. In order to compare comparable functional groups, the same reference numerals are used for corresponding structural groups which agree in the second and third place but always carry the number "2" in the first place in FIGS. 11a to 19.

FIGS. 11a to 11d show a section of a seat frame of a motor vehicle seat which is locked in its memory position with the backrest raised up. Corresponding to the illustration in FIGS. 6 and 6a, the seat frame comprises a seat rail 202 which can be moved in the longitudinal direction L of the seat on a rail 201 fixed on the body, and a fixing device 220 with which the seat rail 202 can be locked relative to the rail 201 fixed on the body.

In order to unlock the fixing device 220, there is an operating lever 209 which has a transverse tube 290 and which can act against the action of a spring assembly 220a on an operating section 220b of the fixing device 220 in order to unlock the fixing device. For this, the operating lever 209 has to be swivelled counterclockwise which can be undertaken for example by a seat user by means of an operating handle, provided for this purpose, on the operating lever 209.

On the other side, the operating lever 209 is also coupled to the backrest through a Bowden cable of which FIGS. 11a to 11d show a Bowden suspension mounting and support 221, its fastening plate 221a and a cable 221b. The cable 221b of the Bowden cable unit is fixed by one end to the backrest of the seat and by its other end is fixed by a cable suspension mounting 222b on a gearing part 222 which has a guide 222a for the cable 221b. The gearing part 222 is mounted to swivel by means of an axle shaft 224 about the same axis as the operating lever 209 and engages round same by means of two arms 223. The gearing part 222 converts a longitudinal movement of the cable 221b which occurs when the backrest is folded forwards, into a swivel movement through which the operating lever 209 acts on the operating section 220b of the fixing device 220 to unlock the fixing device.

The cable 221b is furthermore connected to the upper section 261 of a switching lever 206, namely, through a cable nipple 268 which is squeezed onto the cable and which is mounted in a nipple socket 267 (nipple chamber) in the upper section 261 of the switching lever 206. The nipple socket 267 is fixed on the switching lever 206 by means of a pin 269 and a clip element 269a which is associated with the pin ("Springfix").

The switching lever 206 itself is attached for swivel movement to the seat rail 202 by means of a bearing bush 265, a stepped bolt 265a, a fastening screw 266 as well as an associated washer 266a. When the cable 221b becomes taut as a result of folding the backrest forwards the switching lever 206 is swivelled counterclockwise like the aforementioned gearing part 222, namely, against the action of a torsion spring 264 which is mounted on the swivel axis of the switching lever.

A lower operating section 260 of the switching lever 206 is mounted on an operating section of a locking pawl 204 which is formed as the operating face 240 and which forms the locking unit of a memory device. The locking pawl 204 is mounted for swivel movement by a bearing bolt 245 on a glide 205 which is mounted by its base body 250 displaceable in the longitudinal direction L of the seat. The base body 250 of the glide 205 is adjoined at the top by a bearing section 251 in which the bearing bolt 245 which extends across the longitudinal direction L of the seat is housed for swivel mounting the locking pawl 204.

Furthermore, a slider 256 is mounted longitudinally displaceable on the glide 205. The slider 256 is pretensioned towards the front seat end by means of an elastic element 254 and has a counter stop 259 pointing towards the front seat end on which in the memory position of the seat frame a stop 239 of a stop element 203 is supported which is fixed on the seat rail 202 through fastening screws 236. The glide 205 itself has moreover a stop 253 facing the front seat end and which in the memory position of the seat frame adjoins a stop 229 of the slider 228 which is guided longitudinally movable on a fastening plate 225 connected by screws 226 to the seat rail 202, and is pretensioned towards the rear end of the seat by means of an elastic element 227.

The locking pawl 204, which is mounted for swivel movement on the glide 205, has, at one end, a detent hook 241 which can engage in detent openings 270 of a detent rail 207 and which is pretensioned towards the detent rail 207 by means of an elastic element in the form of a compression spring 400. Nevertheless, the memory device is unlocked in the memory position shown in FIGS. 11a to lid with the backrest folded up since the operating section 260 of the switching lever 206 acts vertically downwards onto the operating face 240 of the locking pawl 204 so that swivelling of the locking pawl 204 which would lead to the detent hook 241 engaging in the detent rail 207 is prevented. A projection 240a projects vertically from the operating face 240 so that the operating section 260 of the switching lever 206 can be supported thereon additionally in the longitudinal direction of the seat.

The locking pawl 204 furthermore has a follower 243 in the form of a projection which, in the memory position of the seat frame when the locking pawl is unlocked, engages in an engagement area 234 of the stop element 203 on the seat frame side so that during displacement of the seat frame in the longitudinal direction L of the seat the locking pawl 204 as well as the glide 205 would be entrained.

Finally, the locking pawl 204 has also a further stop 247 which can interact with an upper stop 257 of the slider 256 mounted on the glide 205 in order to lock the locking pawl 204 in the position in which its detent hook 241 engages in the detent rail 207.

Figure 12:
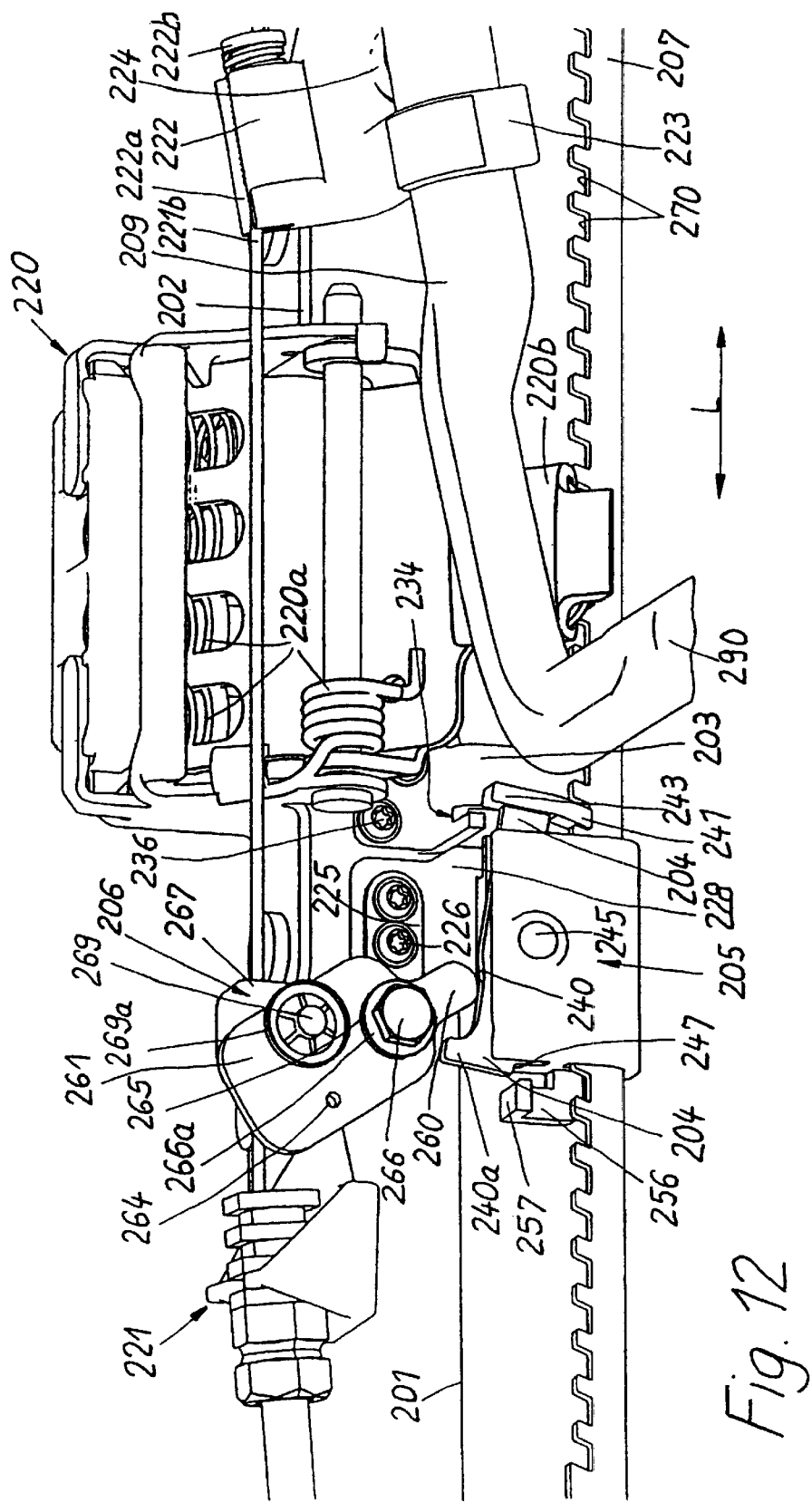
FIG. 12 shows a view according to FIG. 11a where the backrest is folded forwards, in order that the seat can be moved with the backrest folded forward.

FIG. 12 shows the section of the seat frame after folding forward the backrest, explained in detail with reference to FIGS. 11a to 11d. Through the tightening of the cable 221b of the Bowden cable unit, the gearing part 222 as well as the switching lever 206 are hereby swivelled counterclockwise. This leads, on the one hand, to the unlocking of the fixing device 220 through the operating lever 209 connected to the gearing part 222 as well as through the operating element 220b of the fixing device 220. On the other hand, through the swivel movement of the switching lever 206, its operating section 260 is raised from the operating face 240 of the locking pawl 204 so that the locking pawl 204 swivels under the action of the compression spring 400 until its detent hook 241 engages in a detent opening 270 of the detent rail 207. The memory device is then locked in a memory position which corresponds to the longitudinal position of the seat before the backrest is folded forwards.

Through the swivel movement of the locking pawl 204, its follower 243 comes out of engagement with the engagement area 234 of the stop element 203 so that now the seat frame can be moved in the longitudinal direction of the seat without acting on the memory device.

Figure 13A:
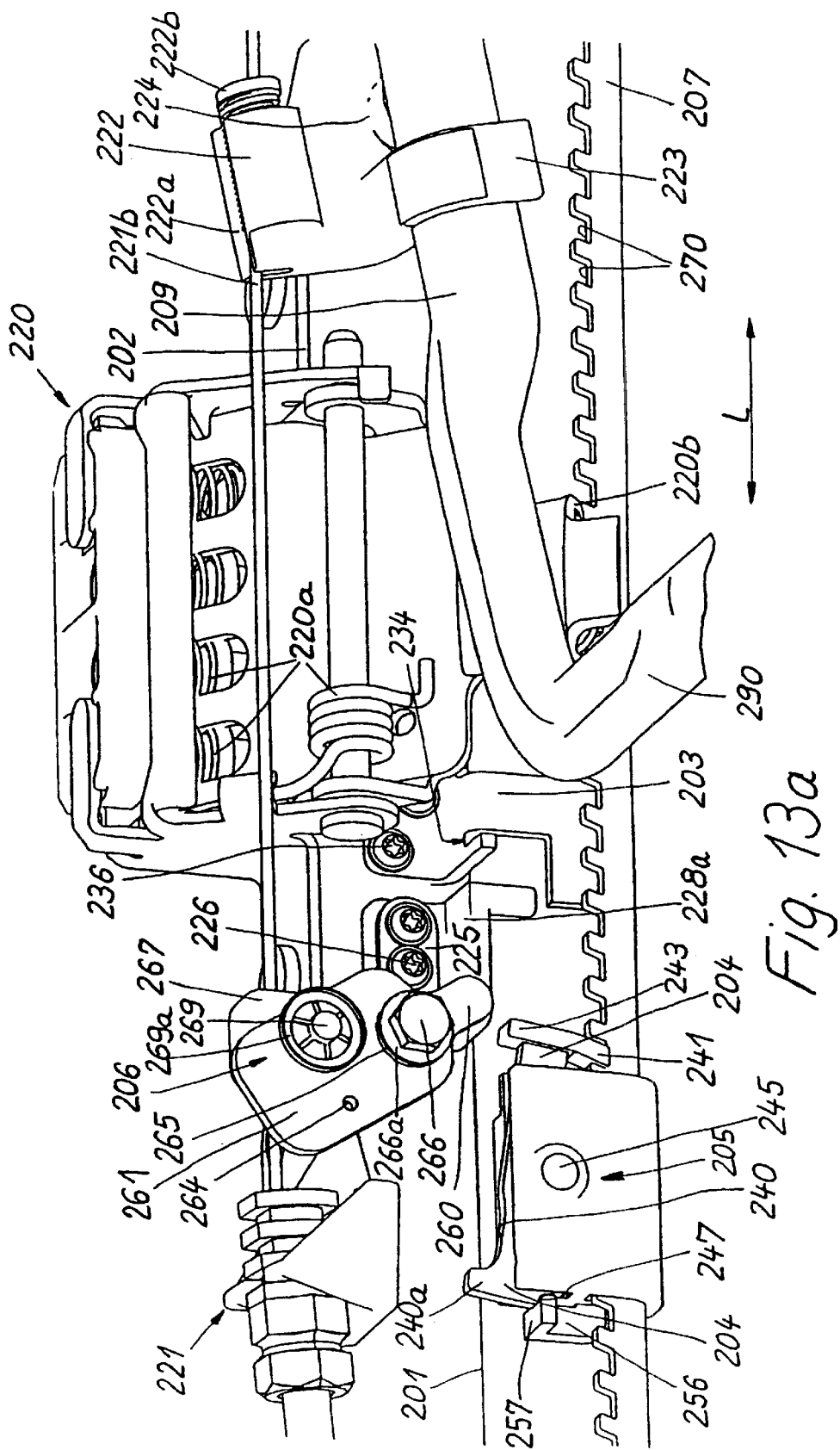
FIG. 13a shows a view according to FIG. 11a where the seat has been moved away out from the memory position with the backrest folded forward.
Figure 13C:
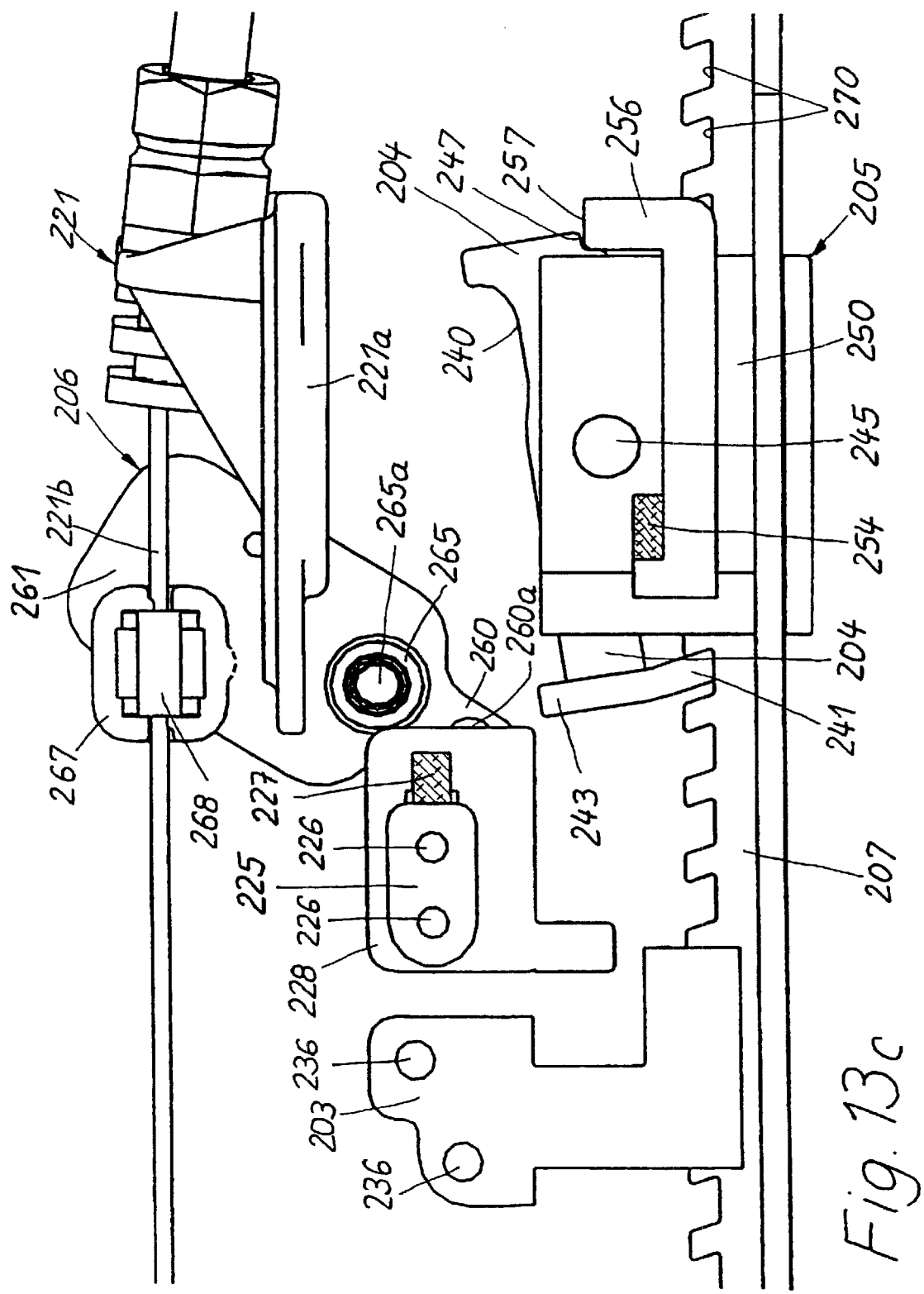
FIG. 13c shows a rear view of the illustration of FIG. 13a without the rails of the longitudinal guide of the seat.

If now the seat is moved forwards with the backrest pushed forward and the fixing device 220 unlocked, then the situation is reached as shown in FIGS. 13a to 13c where the seat frame together with the stop element 203 and the slider 228 mounted on the seat frame have moved away from the memory device. The two elastic elements 227 and 254 hereby relax which were still compressed in the memory position according to FIGS. 11a to lid as a result of the interaction of the stops 229, 253 and 239, 259.

The relaxing of the one elastic element 227 leads to the slider 228 on the seat frame side moving backwards in the longitudinal direction L of the seat whereby a support face 228a of this slider 228 engages underneath a support element 260a of the switching lever 206 so that the switching lever 206 is supported by its support element 260a on this support face 228a and is blocked in its swivelled position.

The relaxation of the other elastic element 254 causes the slider 256 mounted on the glide 205 to move forwards in the longitudinal direction L of the seat and thereby to engage by an upper stop 257 underneath a stop 247 formed by a recess on the locking pawl 204 so that the latter becomes blocked in its locked position.

Through the action of the two elastic elements 227, 254 described above, it is ensured that after folding the backrest forward, the switching lever 206 remains in its swivelled position and furthermore the memory device remains locked. If the seat is then pushed back again with the backrest still folded forwards then on reaching the memory position the two elastic elements 227, 254 are again compressed, namely through the interaction of the corresponding stops, as shown in FIGS. 11a to 11d so that the slider again returns to its position explained with reference to the last-mentioned figures.

FIG. 14 shows the seat frame again in its memory position wherein, however, the operating lever 209 was swivelled manually by means of an operating handle provided for this purpose in order to unlock the fixing device 220. The seat is consequently locked in its memory position with the backrest raised up and the fixing device 220 unlocked. In this state, the locking pawl 204 is out of engagement with the detent rail 207 since the switching lever 206 acts through its operating section 260 on the operating face 240 of the locking pawl and thereby prevents the locking pawl 204 from being swivelled towards to the detent rail 207 by means of the compression spring 400.

Since the locking pawl 204 is located in its unlocked state under the action of the switching lever 206 and thereby its follower 243 engages in the engagement area 234 on the seat frame side, displacement of the seat frame in the longitudinal direction of the seat, starting from the position shown in FIG. 14, leads to the locking pawl 204 being entrained. The newly set longitudinal position of the seat which can be locked by means of the fixing device 220, by letting go of the operating lever 209, then corresponds at the same time also to the new memory position.

Figure 15C:
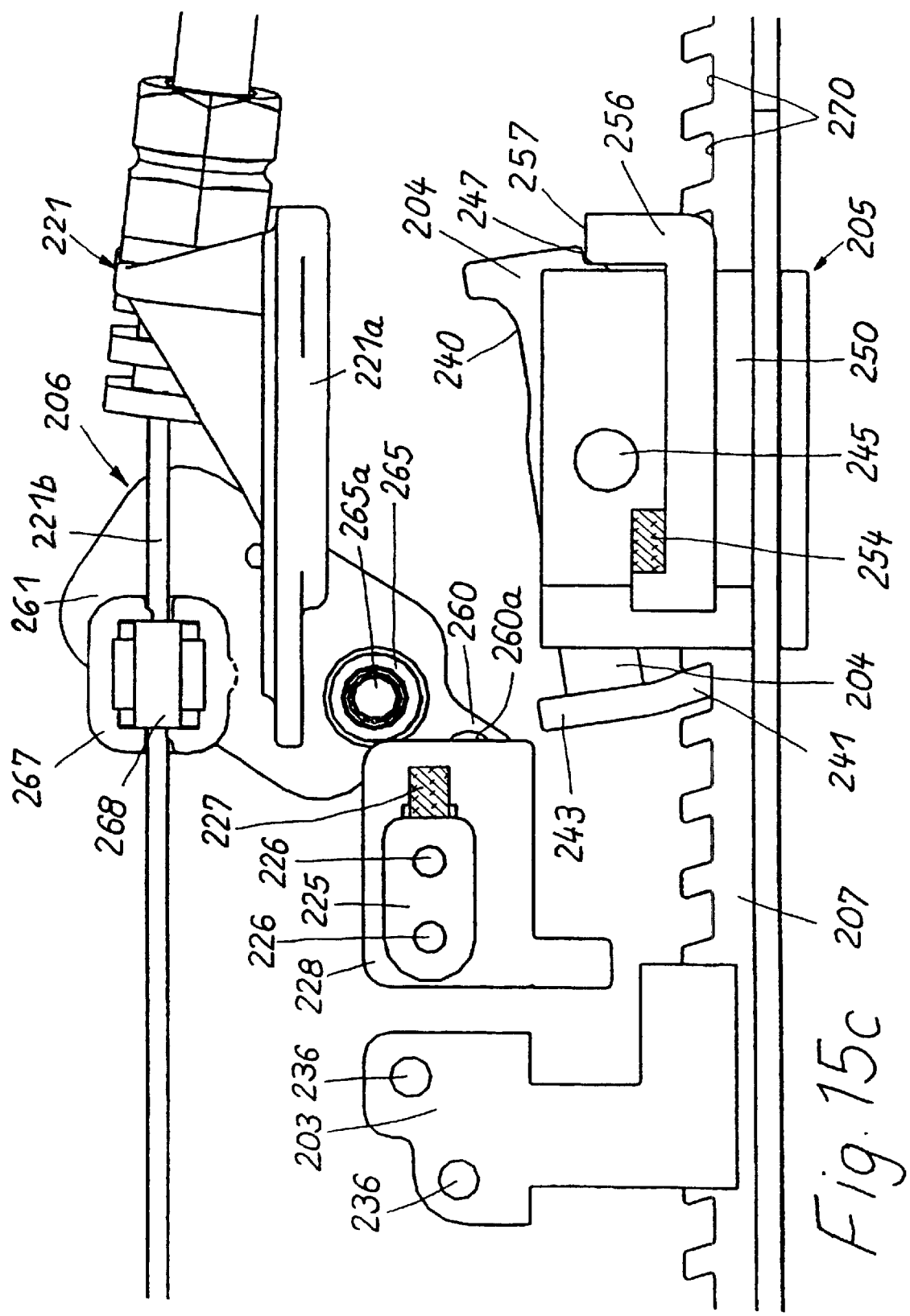
FIG. 15c shows a rear view of the illustration of FIG. 15a without the rails of the longitudinal guide of the seat.

Referring now to FIGS. 15a to 15c, which corresponds to FIGS. 13a to 13c, the approach of the memory position with the backrest folded forwards will now be described. In the situation illustrated in FIGS. 15a to 15c, where the seat is located outside of the memory position with the backrest folded forwards, the fixing device 220 is unlocked and the locking pawl 204 is locked. Furthermore, the switching lever 206 is swivelled counterclockwise under the action of the cable nipple 267 wherein the cable nipple 267 acts continuously on the switching lever 206 through the nipple socket 268 with the backrest folded forwards, thereby locking the switching lever in the swivelled position. The cable nipple 267 thus forms a locking means which, when the backrest is folded forwards, prevents the switching lever 206 from swivelling under the action of the torsion spring 264. The switching lever 206 is additionally held, namely, independently of whether the backrest is folded forwards as before, in its swivelled position in that it is supported through the support element 260a on a support face 228a of the slider 228 on the seat frame side.

FIG. 16 shows reaching the memory position when the seat frame is moved backwards with the backrest folded forwards. Here, the two elastic elements 227, 254 are again compressed, namely, through the interaction of the corresponding stops, as shown in FIGS. 11a to 11d, so that the sliders 228, 256 again return to the position explained with reference to the last figures.

As soon as the support element 260a of the switching lever 206 is no longer supported on the support face 228a of the slider 228 on the seat frame side, then the switching lever 206 is still only held in its swivelled position by the action of the cable nipple 267. If now, after reaching the memory position with the backrest folded forwards, the backrest is raised up again, the cable 221b of the Bowden cable unit relaxes so that both the switching lever 206 and also the operating lever 209 swivel clockwise under the action of the spring elements 264 and 220a respectively. The swivelling of the switching lever 206 causes the locking pawl 204 to be unlocked through vertical action of the operating section 260 of the switching lever 206 on the operating face 240 of the locking pawl 204 (against the action of the compression spring 400, see FIG. 11d). The swivelling of the operating element 209 however causes locking of the fixing device 220. The seat is then again located in the position shown in FIGS. 11a to 11d.

Figure 17B:
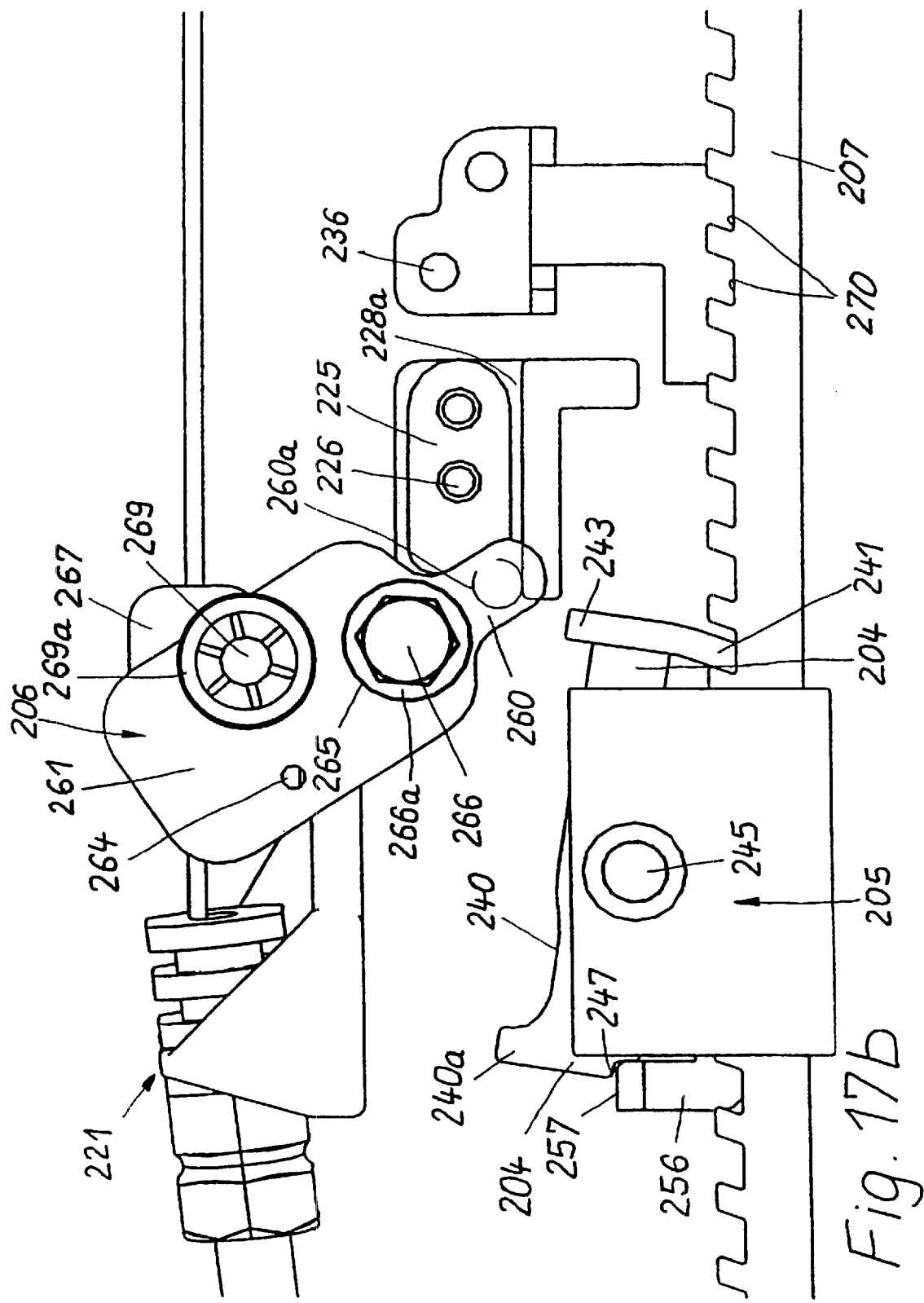
FIG. 17b shows a detailed view of the illustration of FIG. 17a without the rails of the longitudinal guide of the seat.

FIGS. 17a to 17c show a section of the seat frame after the seat frame has been moved forwards out of the memory position with its backrest folded forwards and after the backrest has then been raised whereby the operating lever 209 was manually swivelled in order to unlock the fixing device 220 and to allow the seat frame to move in the longitudinal direction L of the seat. In this longitudinal position of the seat, the seat frame would be lockable by letting go the operating lever 209 and through the subsequent locking of the fixing device 220.

In FIGS. 17a to 17c, despite raising up the backrest, the switch lever 206 has swivelled as before against the action of the torsion spring 264. This is due to the fact that the switching lever 206 is supported on the support face 228a of the slider 228 on the seat frame side through the support element 260a in the form of a support bolt. The swivelled position of the switching lever 206, which was produced when folding the backrest forwards, is hereby preserved (see FIGS. 12 and 13a to 13c). After folding the backrest back up, the support face 228 of the slider 228 on the seat frame side thus now still acts as a locking means which prevents the switching lever 206 from swivelling back into its vertical position. In other words, the locking action of the cable nipple 267, which locks the switching lever 206 in its swivelled position with the backrest folded forwards, is continued during subsequent raising up of the backrest outside of the memory position through the support face 228a of the slider 228 on the seat frame side.

Figure 18B:
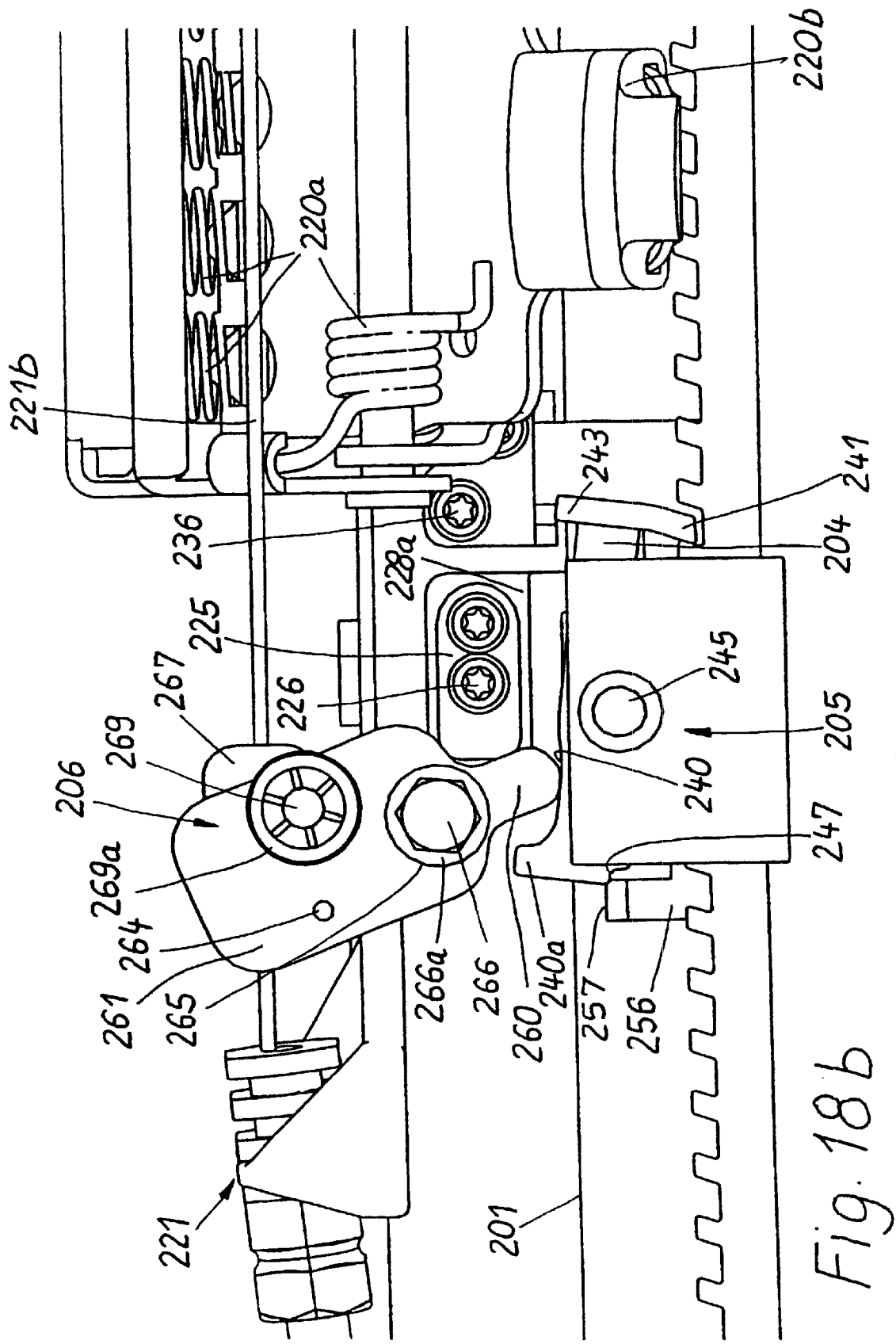
Figure 18C:
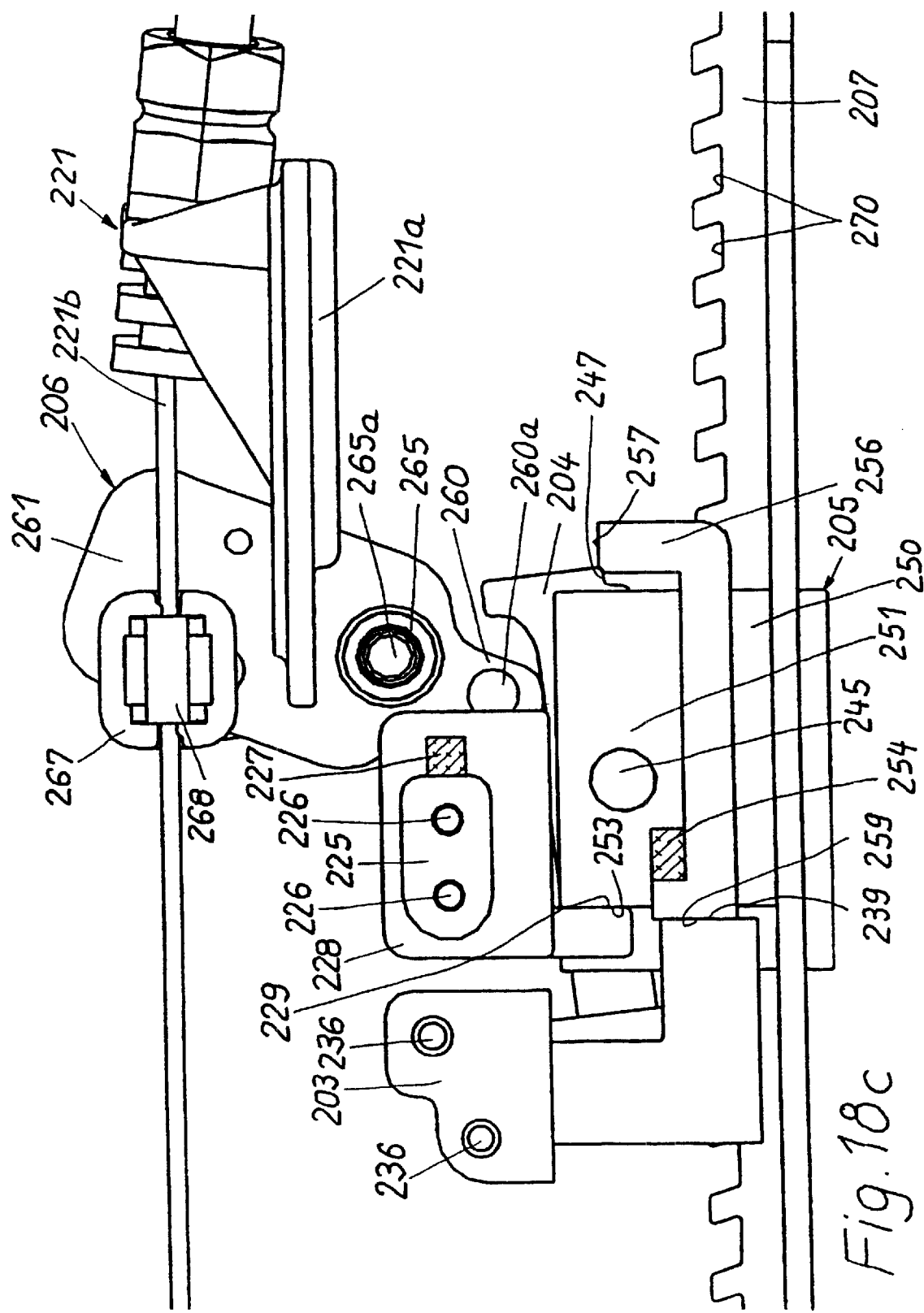
FIG. 18c shows a rear view of the view of FIG. 18a without the rails of the longitudinal guide of the seat.

According to the embodiment shown in FIGS. 18a to 18c, the memory position is reached by sliding the seat frame backwards with the backrest raised up wherein the operating section 260 of the switching lever 206 slides on the operating face 240 of the locking pawl 204. Then one side of the glide 205 strikes by a stop 253 against a stop 229 of the slider 228 on the seat frame side, and on the other the slider 256 mounted on the glide 205 strikes by a stop 259 against a stop 239 of the stop element 203 on the seat frame side. The two elastic elements 227 and 254 which are associated with the two sliders 228, 256 are hereby compressed again. The slider 228 on the seat frame side is thereby moved forwards in the longitudinal direction L of the seat so that its support face 228 releases the support element 260a of the switching lever 206. On the other hand, the slider 256 mounted on the glide 205 is moved back in the longitudinal direction L of the seat so that its upper stop 257 no longer engages underneath the locking pawl 204 in the region of the recess 247. Thus both, the switching lever 206 and the locking pawl 204 are hereby no longer locked in the state occupied by folding the backrest forwards.

The switching lever 206 can now swivel back into its vertical position under the action of the torsion spring 264 whereby the locking pawl 204 is lifted (against the action of the compression spring 400, see FIG. 11d) by its detent hook 241 out of detent rail 207, thus becomes unlocked. To this end, the resetting force of the torsion spring 264 which is mounted on the swivel axis of the switching lever 206 must be sufficiently great to overcome the resetting force of the compression spring 400 of the locking pawl 204.

Figure 19:
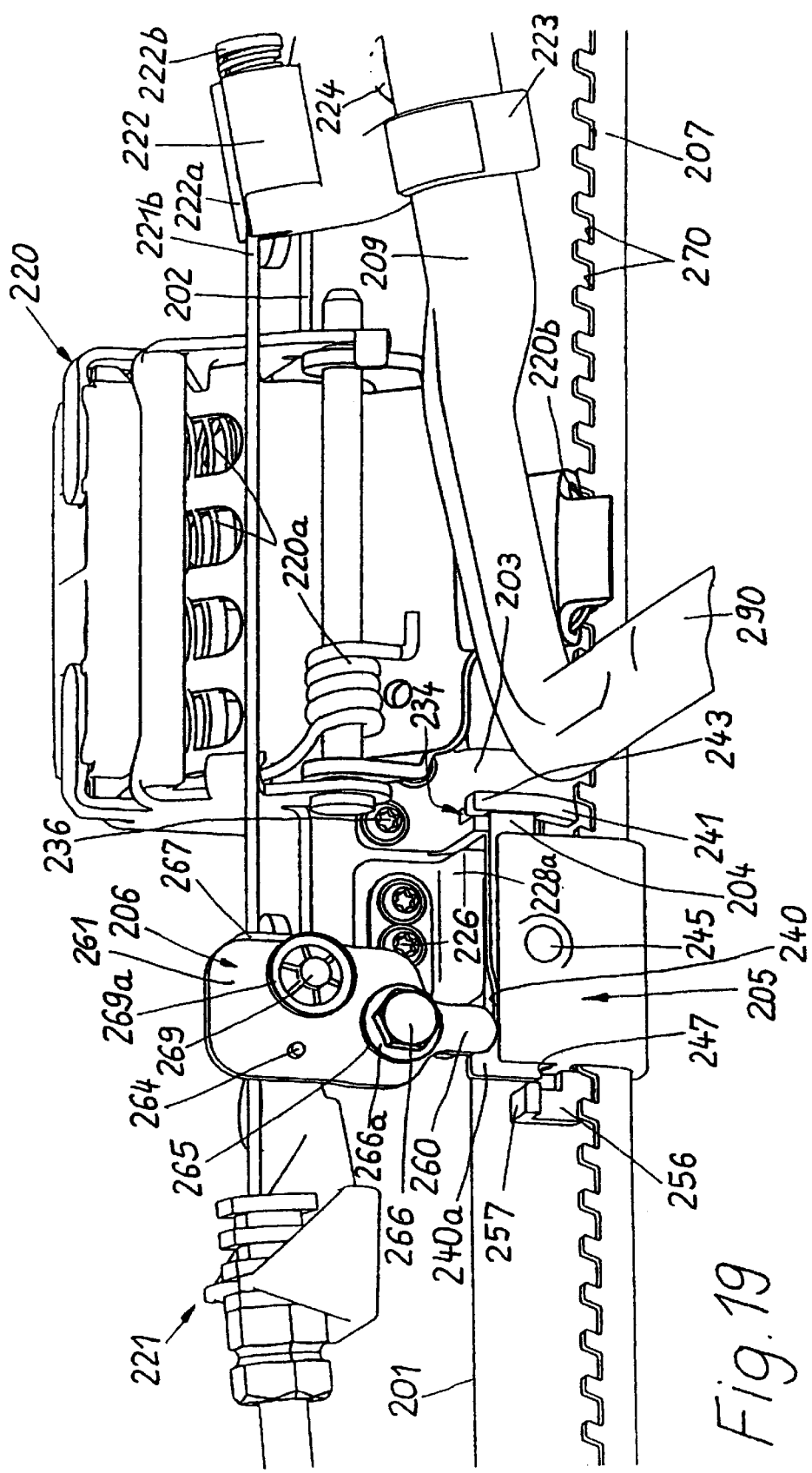
FIG. 19 shows a view according to FIG. 11a after reaching the seat memory position with the backrest raised.

The switching lever 206 then stands vertical, according to FIG. 19, and acts vertically through its operating section 260 on the operating face 240 of the locking pawl 204 whereby the locking pawl is unlocked and, furthermore, engages by its follower 243 in the associated engagement area 234 of the stop element 203. If the operating lever 209 is let go again, then the fixing device 220 returns under the action of the spring assembly 220a back into its locked state so that the two rails 201, 202 of the longitudinal guide rails are locked relative to each other. This corresponds to the starting position explained in detail with reference to FIGS. 11a to 11d and in which the seat is locked in its memory position with the backrest raised up.

As far as the stops 229, 253 and 239, 259 and the associated elastic elements 227 and 254 are concerned, which become active on reaching the seat memory position, there can be various modifications to the embodiment illustrated. For example, the individual stops 229, 239, 253 and 259 can be arranged so that the two pairs of stops 229, 253 and 239, 259 do not come into contact with each other simultaneously but one after the other. The elastic elements 225, 254, which are each associated with one pair of stops, can have different deformability. For example, the elastic element of that pair of stops which first engage with each other on reaching the seat memory position has a comparatively large spring constant, and thus, can be deformed only with great difficulty. In this case, the associated slider 228 or 256, on reaching the seat memory position, is then only moved by compressing the associated elastic element if, on moving the seat frame into the seat memory position, a sufficiently large force is expended, and only then does the second pair of stops come into engagement so that the locking pawl is finally unlocked.

Through the possible variations regarding the arrangement of the stops as well as with regard to the deformability of the associated elastic element it can be reached, for example, that there only results unlocking of the locking pawl when, on approaching the memory position, a sufficiently large force is applied. Otherwise, the pretensioning force of the elastic elements (or at least of one of the elastic elements which has a particularly large spring constant) cannot be overcome so that the locking pawl and, thus, the memory device overall remain locked.

Independently of the concrete configuration, one important function of the two sliders 228, 256 and associated elastic elements 227, 254 lies in their causing a permanent locking of the switching lever 206 and locking pawl 204 in the position set by folding the backrest forwards when the seat is moved out of the memory position with its backrest folded forwards, namely, also after subsequently raising up the backrest outside of the memory position. On the other hand, the sliders 228, 256 and the associated elastic elements 227, 254 enable, when subsequently sliding the seat backwards into the memory position, the blocking of the switching lever 206 and of the locking pawl 204 to be lifted so that the locking pawl 204 can again be unlocked.

A common feature of all the embodiments described above is that a resetting of the memory position automatically takes place when the seat is moved out of the memory position after unlocking the fixing device in the memory position with the backrest folded forwards. In this state the locking unit (locking pawl) of the memory device is unlocked and the follower of the memory device is located in engagement with an engagement area on the seat frame side so that the locking unit of the memory device mounted displaceable on a glide is entrained, together with the counter stop formed on the memory device, during setting of the longitudinal position of the seat. If in the newly set longitudinal position of the seat the backrest is folded forwards in order to allow the easy entry function, the memory device is locked by means of its locking unit in this longitudinal position of the seat which corresponds to the new memory position. A seat user need not therefore have to first learn how to use the memory device, but rather, the memory function is automatically guaranteed within the scope of standard adjustment of the longitudinal position of the seat.

What is claimed is:

1. An automobile seat comprising:

a seat frame having a stop;

a backrest swivel mounted on the seat frame, wherein the backrest can be folded forwards towards a seat surface of the seat frame;

a longitudinal guide by which the seat frame can be moved in a longitudinal direction of the seat in order to regulate a longitudinal position of the seat;

a fixing device for locking the seat frame in a previously regulated seat longitudinal position;

an operating element for unlocking the fixing device so that the seat frame can be moved in the longitudinal direction of the seat;

a coupling mechanism which acts on the operating element to unlock the fixing device when the back rest is folded forwards towards the seat surface;

a memory device by means of which the seat frame can, during movement in the longitudinal direction of the seat, be automatically stopped in a predeterminable seat longitudinal position defined as a memory position when the stop associated with the seat frame and movable in the longitudinal direction of the seat engages with a counter stop of the memory device, the memory device further including a regulating means to regulate the memory position in the longitudinal direction of the seat, the memory device further including a locking device for locking a regulated memory position; and a switching means to unlock the locking device in order to adjust the memory position;

wherein the coupling mechanism only acts on the operating element to unlock the fixing device for as long as the backrest is folded forwards; wherein the seat frame is lockable by the fixing device when the backrest is not folded forwards; wherein the locking device of the memory device is elastically pretensioned towards a locked position.

2. The automobile seat according to claim 1 wherein locking means are coupled to the backrest and when the backrest is folded forwards the locking means are in active connection with the switching means in order to prevent unlocking of the locking device.

3. The automobile seat according to claim 2 wherein the locking means are coupled to the backrest through one of a pull means and a push means.

4. The automobile seat according to claim 2 or 3 wherein the locking means are coupled to the backrest through the coupling mechanism which acts on the operating element.

5. The automobile seat according to claim 2 wherein the locking means includes at least one locking element which is displaced when the backrest is folded forwards so that the at least one locking element comes into active connection with the switching means and blocks unlocking of the locking device.

6. The automobile seat according to claim 5 wherein the at least one locking element is moved in the longitudinal direction of the seat when the backrest is folded forwards.

7. The automobile seat according to claim 5 wherein the locking element is swivelled when the backrest is folded forwards.

8. The automobile seat according to one of claims 5 to 7 wherein the locking element has at least one stop which when the backrest is folded forwards comes into active connection with the switching means and thereby blocks unlocking of the locking device.

9. The automobile seat according to one of claims 5 to 7 wherein the locking element is connected to the switching means and when the backrest is folded forwards the locking element acts on the switching means so that unlocking of the locking device is blocked.

10. The automobile seat according to claim 1 wherein the switching means have a switching lever which can be swivelled in order to unlock the locking device.

11. The automobile seat according to claim 1 wherein the switching means have a switching spring which can be deformed in order to unlock the locking device.

12. The automobile seat according to claim 1 wherein the switching means are mounted on the seat frame.

13. The automobile seat according to claim 1 wherein the switching means are arranged such that they can only act on the locking device for unlocking when the seat frame is in the memory position.

14. The automobile seat according to claim 1 wherein the switching means are pretensioned towards a first switching position and that the switching means can be switched into a second switching position wherein in one of the first and second switching positions the locking device is locked and in the other of the first and second switching positions the locking device is unlocked.

15. The automobile seat according to claim 1 wherein the switching means are coupled with the fixing device when the seat frame is located in the memory position.

16. The automobile seat according to claim 15 wherein the switching means can be switched during operation of the fixing device when the seat frame is located in the memory position.

17. The automobile seat according to claim 16 wherein the switching means during unlocking of the fixing device are switched so that the locking device is unlocked.

18. The automobile seat according to claim 16 wherein the switching means during locking of the fixing device are switched so that the locking device is unlocked.

19. The automobile seat according to claim 1 wherein in the memory position of the seat frame when the backrest is not folded forwards and when the locking device is unlocked the switching means are supported so that during unlocking of the fixing device the switching means are not switched.

20. The automobile seat according to claim 19 wherein the switching means are supported on a face associated with the locking device.

21. The automobile seat according to claim 19 wherein the switching means are supported by an elastic element.

22. The automobile seat according to claim 1 wherein the switching means on approaching the memory position with the backrest not folded forwards are at first deactivated and unlocking of the locking device is thereby prevented.

23. The automobile seat according to claim 15 or 22 wherein the switching means during subsequent unlocking of the fixing device are actuated so that they can again act on the locking device for the purpose of unlocking.

24. The automobile seat according to claim 23 wherein the locking device can be unlocked by unlocking the fixing device.

25. The automobile seat according to claim 22 wherein the switching means are associated with a guide face of the memory device and that the guide face is formed so that the switching means when approaching the memory position with the backrest not folded forwards are guided along the guide face in order to prevent unlocking of the locking device through the switching means.

26. The automobile seat according to claim 23 wherein the switching means during locking of the fixing device are actuated so that the switching means are lifted from the guide face.

27. The automobile seat according to claim 22 wherein the switching means are associated with a stop face of the memory device and that the stop face is arranged so that the stop face on approaching the memory position with the backrest not folded forwards acts on the switching means in order to prevent unlocking of the locking device through the switching means.

28. The automobile seat according to claim 23 wherein the switching means during locking of the fixing device are actuated so that they are lifted from the stop face.

29. The automobile seat according to claim 1 wherein the locking device of the memory device is elastically pretensioned towards a locked position.

30. The automobile seat according to claim 29 wherein the switching means in the memory position with the backrest not folded forwards act on the locking device so that the locking device is unlocked against an elastic pretension force.

31. The automobile seat according to claim 1 wherein the locking device has a locking unit which can be displaced together with the counter stop of the memory device in the longitudinal direction of the seat.

32. The automobile seat according to claim 31 wherein the locking unit is associated with a detent device which has detent sites arranged in succession in the longitudinal direction of the seat and on which the locking unit can be locked relative to the detent device.

33. The automobile seat according to claim 32 wherein the locking unit comprises a swivel mounted locking pawl which has a detent element which can engage at the detent sites in the detent device and which has an operating section on which the switching means can act in order that the detent element can engage in the detent mechanism.

34. The automobile seat according to one of claims 31 to 33 wherein the memory device has a follower which can be brought into engagement with the seat frame in order that the counter stop and the locking unit of the memory device can be displaced together with the seat frame in the longitudinal direction of the seat.

35. The automobile seat according to claim 34 wherein the follower is associated with an engagement area of the seat frame and that the follower can be brought into engagement with the engagement area by swivelling the follower and the engagement area relative to each other.

36. The automobile seat according to claim 34 wherein the follower and the engagement area can only be brought into engagement with each other if the seat frame is located in the memory position.

37. The automobile seat according to claim 34 wherein the follower is connected with the locking device of the memory device so that it can only be brought into engagement with the engagement area of the seat frame when the locking device of the memory device is unlocked.

38. The automobile seat according to claim 33 wherein the follower is mounted on the locking pawl.

39. The automobile seat according to claim 31 wherein the memory device has a glide which is mounted movable in the longitudinal direction of the seat and on which the locking unit and the counter stop are mounted.

40. The automobile seat according to claim 33 or claim 39 wherein the locking pawl is mounted for swivel movement on the glide.

41. The automobile seat according to claim 31 wherein at least one elastically pretensioned slider is mounted movable on one of the memory device and the seat frame and in the memory position the at least one elastically pretensioned slider is on a stop part of one of the seat frame and the memory device and during displacement of the seat frame the at least one elastically pretensioned slider can be moved out of the memory position as a result of the pretension into such a position that it prevents unlocking of the locking unit.

42. The automobile seat according to claim 41 wherein the locking unit has an elastically pretensioned movably mounted slider which is supported in the memory position against the pretension on a stop element of the seat frame and which during displacement of the seat frame is moved out of the memory position as a result of the pretension into a position so that it prevents unlocking of the locking unit.

43. The automobile seat according to claim 33 or 42 wherein the slider is moved during displacement of the seat frame out of the memory position as a result of the pretension into such a position that it engages on the locking pawl and thereby prevents unlocking of the locking pawl.

44. The automobile seat according to claim 41 wherein the seat frame has an elastically pretensioned movably mounted slider which in the memory position is supported against pretension on a stop of the memory device and which is moved during displacement of the seat frame out of the memory position with the backrest folded forwards as a result of the pretension into such a position that it blocks the action of the switching means on the locking device which leads to unlocking of the locking device and that when the backrest is raised up out from the forward folded position, the position of the slider is not affected.

45. The automobile seat according to claim 44 wherein the slider has a support section on which the switching means are supported so that action of the switching means on the locking device, which leads to unlocking of the locking device, is blocked.

46. The automobile seat according to claim 41 wherein the at least one slider is moved through the action of the stop element against pretension when the seat frame reaches the memory position, and that through the slider unlocking of the locking device is no longer blocked.

47. The automobile seat according to claim 46 wherein the switching means are pretensioned elastically towards a switching position in which they cause unlocking of the locking device.

48. The automobile seat according to claim 1 wherein the operating element for unlocking the fixing device can also be operated independently of a position of the backrest.

49. The automobile seat according to claim 1 wherein the operating element is resiliently pretensioned against the position which is occupied to unlock the fixing device.

50. The automobile seat according to claim 48 wherein the operating element for unlocking the fixing device is operated by an operating lever.

* * * * *